US011684901B2

(12) United States Patent
Meshkat Mamalek et al.

(10) Patent No.: US 11,684,901 B2
(45) Date of Patent: Jun. 27, 2023

(54) METHOD FOR PREPARATION OF METAL NANOWIRES

(71) Applicant: INTERCOMET, S.L., Madrid (ES)

(72) Inventors: Mojtaba Meshkat Mamalek, Madrid (ES); Mohammad-Reza Azani, Madrid (ES); Azin Hassanpour, Madrid (ES); Nicoló Plaia, Madrid (ES)

(73) Assignee: INTERCOMET, S.L., Madrid (ES)

( * ) Notice: Subject to any disclaimer, the term of this patent is extended or adjusted under 35 U.S.C. 154(b) by 67 days.

(21) Appl. No.: 17/251,018

(22) PCT Filed: Jun. 12, 2019

(86) PCT No.: PCT/EP2019/065394
§ 371 (c)(1),
(2) Date: Dec. 10, 2020

(87) PCT Pub. No.: WO2019/238781
PCT Pub. Date: Dec. 19, 2019

(65) Prior Publication Data
US 2021/0213531 A1 Jul. 15, 2021

(30) Foreign Application Priority Data
Jun. 12, 2018 (EP) .................................... 18382414

(51) Int. Cl.
B22F 9/24 (2006.01)
B22F 1/054 (2022.01)

(52) U.S. Cl.
CPC .............. *B22F 9/24* (2013.01); *B22F 1/0547* (2022.01); *B22F 2301/255* (2013.01)

(58) Field of Classification Search
None
See application file for complete search history.

(56) References Cited

U.S. PATENT DOCUMENTS 9,205,493 B1 * 12/2015 Young .................... B22F 1/0547
2010/0242679 A1 * 9/2010 Yu ........................... B82Y 30/00
75/343

FOREIGN PATENT DOCUMENTS

CN 110238410 A * 9/2019
CN 110369732 A * 10/2019

OTHER PUBLICATIONS

English translation of CN 110369732 (originally published Oct. 25, 2019) from Espacenet.*
Yun, H.D. et al., "Effective Synthesis and Recovery of Silver Nanowires Prepared by Tapered Continuous Flow Reactor for Flexible and Transparent Conducting Electrode", Metals, vol. 6, No. 14, 14 pp., Published Jan. 8, 2016.*
Han, X-W. et al., "Synthesis of transparent dispersion of monodispersed silver nanoparticles with excellent conductive performance using high-gravity technology", Chemical Engineering Journal, vol. 296, pp. 182-190, Available online Mar. 23, 2016.*
English Translation of CN 110238410 (originally published Sep. 17, 2019), obtained from PE2E search.*

(Continued)

*Primary Examiner* — George Wyszomierski
(74) *Attorney, Agent, or Firm* — Gary J. Gershik

(57) ABSTRACT

The present invention refers to a method for the preparation of zero-valent-transition metal nanowires such as crystalline silver nanowires, and to a reactor oven for the preparation of zero-valent-transition metal nanowires.

13 Claims, 5 Drawing Sheets

(56) References Cited

OTHER PUBLICATIONS

Figure 1:
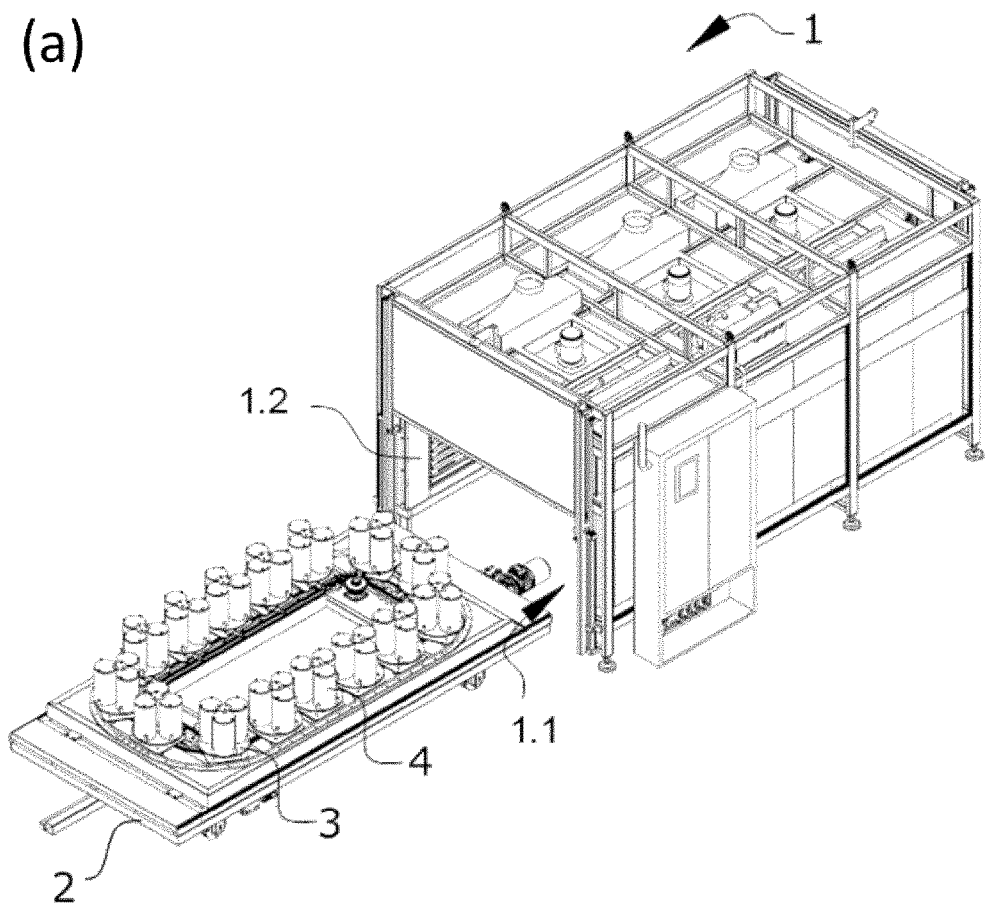
Figure 1:
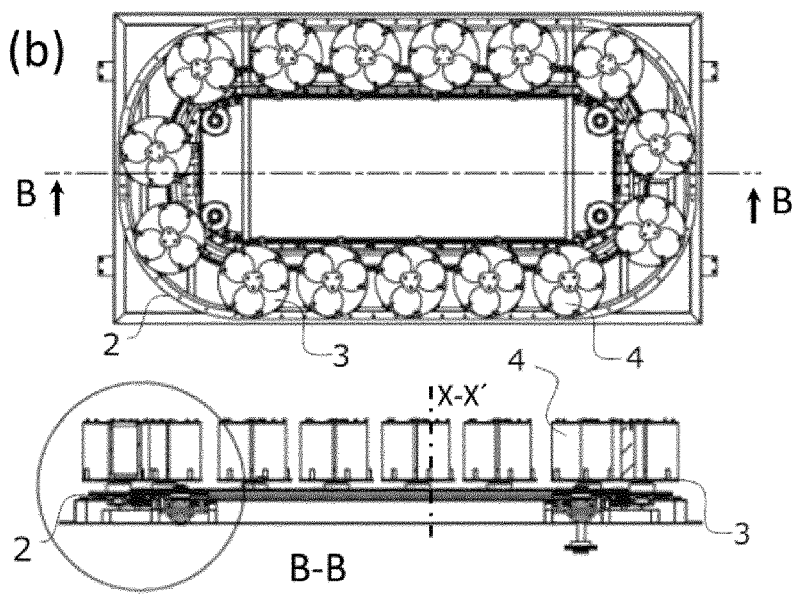
Figure 1:
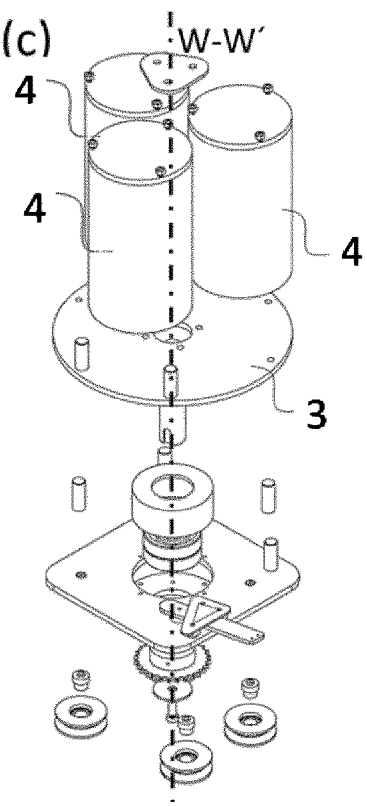

U.S. Patent Application Publication No. US 2011/0045272 A1, published on Feb. 24, 2011 (Allemand).
U.S. Patent Application Publication No. US 2013/0039806 A1, published on Feb. 14, 2013 (Blinn et al.).
PCT International Patent Application Publication No. WO 2014/169487, (Zhejiang Kechuang Advanced Materials Co., Ltd. [CN/CN]) published Oct. 23, 2014.
European Patent Application EP 3 115 135 (Dowa Holdings Co., Ltd. [JP]), published on Nov. 1, 2017.
Japanese Patent Application No. JPS 61 114 732, published Nov. 10, 1984, including English Translation.
Abbasi, N.M., Preparation of Silver Nanowires and Their Application In conducting polymer nanocomposites, Materials Chemistry and Physics xxx (215), p. 1-15, hhttp://dx.doi.org/10.1016/j.matchemphys.215.08.056, available online Sep. 7, 2015.

\* cited by examiner

METHOD FOR PREPARATION OF METAL NANOWIRES

RELATED APPLICATIONS

This application is a § 371 national stage of PCT International Application No. PCT/EP2019/065394, filed Jun. 12, 2019, claiming priority of European Patent Application No. 18382414.3, filed Jun. 12, 2018, the contents of each of which are hereby incorporated by reference into this application.

FIELD OF THE INVENTION

The present invention relates to the area of metal nanowires. More specifically, the present invention relates to methods for preparing zero-valent-transition metal nanowires and to an over for said method.

BACKGROUND

Metal nanowire networks have attracted great attention for the fabrication of transparent conducting films (TCFs) in optoelectronic applications such as touch screens, liquid crystal displays and solar cells. By using highly conductive metal nanowires, transparent conductive films with low sheet resistance and high transmittance can be obtained. Among different metals, silver (Ag) has great electrical and thermal conductivities and the ability to enhance electrical and optical properties of TCFs. Thus, TCFs based on silver nanowires have been successfully used in organic solar cells and light-emitting diodes (LEDs), highlighting silver nanowires, as promising optoelectrical materials with comparable performance to indium tin oxide, along with bending and stretching stability.

Abbasi et al. (Abbasi N. M. et al, Mater. Chem. Phys, 2015, 166, 1-15) reported several fabrication processes to prepare silver nanowires such as polyol processes, solvothermal methods, ultraviolet radiation techniques, photoreduction techniques, electro-deposition processes and DNA template methods among others. Amongst the different approaches described, the solvothermal method is the most appropriated method to produce nanowires at large scale. However, one challenge of large scale production of nanowires by solvothermal methods is the limitation in the reactor sizes for up-scaled processes. Additionally, when several reactors are used at the same time the nanowires obtained in the different batches are not homogeneous. Moreover, the methods described above have difficulties in tuning the final characteristics of the products.

Solvothermal methods commonly lead to products that comprise a mixture of nanowires and nanoparticles. The presence of nanoparticles has an adverse effect on the optical and/or electrical properties of the final product. Also, despite nanowires with high aspect ratio (length/dimeter) are generally preferred in most applications, the thinner the nanowires obtained by solvothermal methods, the higher is the ratio of nanoparticles/nanowires obtained in the products. Then, an additional purification step is usually needed in such methods to reduce the amount of nanoparticles present in the final products. At the moment dead-end filtration, centrifugation, gel electrophoresis, selective precipitation and cross flow filtration are the most common techniques applied to purify the products. However, these methods have several limitations. For example, simple dead-end filtration can damage the nanowires and add impurities to the filter cake. Nanowires can also suffer aggregation and deformation under centrifugation. And, despite being a highly effective purification method, gel electrophoresis is difficult to scale up for large scale production methods.

United States Patent Application No. US20110045272A1 describes the use of selective precipitation agents for purification of metal nanostructures. In particular, the use of a solvent such as acetone to aggregate and precipitate metal nanowires and separate them from nanoparticles and other impurities. However the use of high amounts of solvents makes this method not environmentally friendly and difficult to apply in large scale purification.

United States Patent Application No. US2013/0039806A1 describes a tangential flow (cross-flow) filtration method to be used in large-scale purification of nanowire slurries to remove nanoparticles and other impurities. However, the filters available for cross-flow filtration have small pore sizes, are expensive, difficult to clean and only withstand a few uses. Also, the small internal diameter of said filters enhances the aggregation of the nanowires.

Therefore, there is a clear need for a large-scale, efficient and low-cost method for the synthesis of zero-valent-transition metal nanowires, particularly, with high purity and high aspect ratio.

BRIEF DESCRIPTION OF THE INVENTION

The authors of the present invention have developed a high yield and low-cost method for the preparation of zero-valent-transition metal nanowires.

In particular, it has been observed that by using a solvothermal method for the preparation of zero-valent-transition metal nanowires comprising a translational movement and/or a rotational movement of the reactors during a heating step; pure and crystalline zero-valent transition metal nanowires are obtained with high yield having uniform average diameters and lengths. In addition, since the method of the present invention is a simple procedure, it can be applied for large-scale production of zero-valent-transition metal nanowires. Moreover, by simple modifications in some parameters of the method of the present invention, the characteristics of the zero-valent-transition metal nanowires such as average diameter or length range can be modulated.

Therefore, a first aspect of the invention is directed to a method for the preparation of zero-valent-transition metal nanowires comprising the steps of:
  i) providing a reaction mixture comprising: at least one capping agent, at least one transition metal salt, and at least one polar solvent;
  ii) adding the reaction mixture obtained in step (i) to at least one reactor;
  iii) heating the at least one reactor of step (ii) at a temperature between 30 and 300° C. for a period of time between 10 min and 7 days under a pressure of at least 100 KPa in a reactor oven to obtain a suspension comprising zero-valent-transition metal nanowires;
    wherein said at least one reactor comprises a longitudinal axis X-X' and performs at least one of the following movements:
      a translational movement following a path, and
      a rotational movement around the longitudinal axis X-X' or around an axis W-W' parallel to said longitudinal axis X-X'; and
  iv) optionally performing a purification process of the suspension obtained in step (iii) to obtain a purified suspension comprising zero-valent-transition metal nanowires.

In a disclosure, the present invention describes zero-valent-transition metal nanowires obtainable by the method for the preparation of zero-valent-transition metal nanowires as defined above.

In a disclosure, the present invention describes a conductive ink composition comprising the zero-valent-transition metal nanowires as defined above and at least one solvent.

In a disclosure, the present invention describes the use of the zero-valent-transition metal nanowires as defined above in optoelectronics, biochemical sensing, biomedical imaging, surface enhanced Raman scattering field, catalysis, electromagnetic interference shielding and anti-microbial applications.

In an additional aspect, the present invention is directed to a reactor oven for the preparation of zero-valent-transition metal nanowires comprising:
- a thermally insulated chamber, comprising at least an entry and temperature control means;
- a conveyor adapted to perform a translational movement following a path;
- at least one rotating platform located on the conveyor; and
- at least one reactor located on the rotating platform;
- wherein said at least one reactor comprises a longitudinal axis X-X'; and
- wherein said rotating platform is adapted to perform a rotational movement around the longitudinal axis X-X' or around an axis W-W' parallel to said longitudinal axis X-X'.

In a further disclosure, the present invention describes a filtration unit for the preparation of zero-valent-transition metal nanowires comprising:
a. a filter housing comprising an inlet, and a first outlet and a second outlet; and
b. at least one cylindrical filter allocated within the housing between the inlet and the first outlet and the second outlet;
wherein the inlet and the two outlets and are fluidically communicated.

FIGURES

FIG. 1: (a) Perspective view of a reactor oven of a particular embodiment of the present invention, (b) top view and front section view of a conveyor of a particular embodiment of the present invention and (c) exploded view of a rotating platform with three reactors of a particular embodiment of the present invention.

Figure 2:
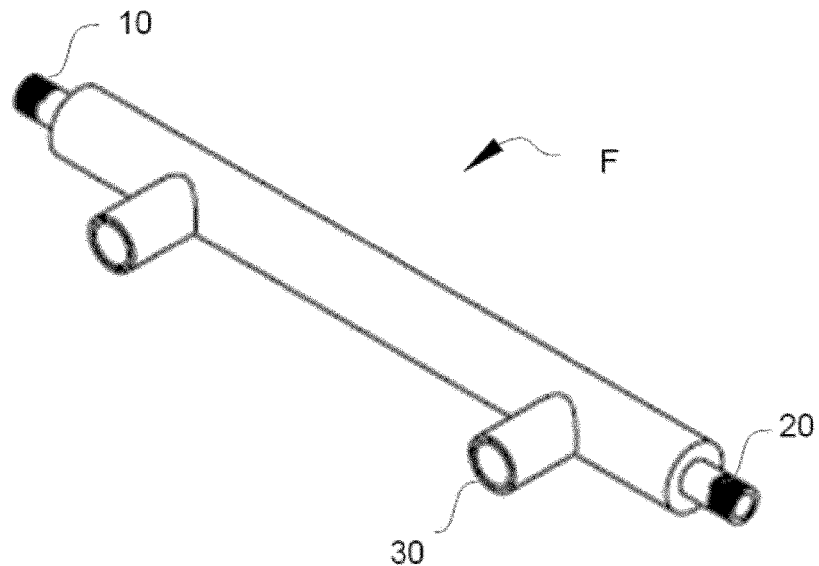
Figure 2:
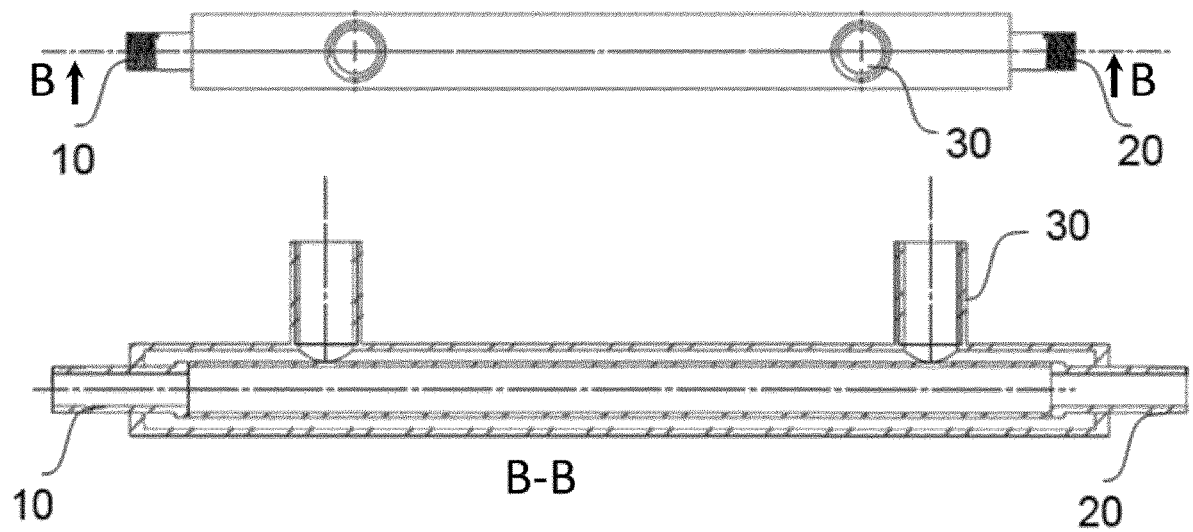

FIG. 2: (a) Perspective view of a filtration unit of a particular embodiment of the present invention and (b) top view and front section view of a filtration unit of a particular embodiment of the present invention.

Figure 3:
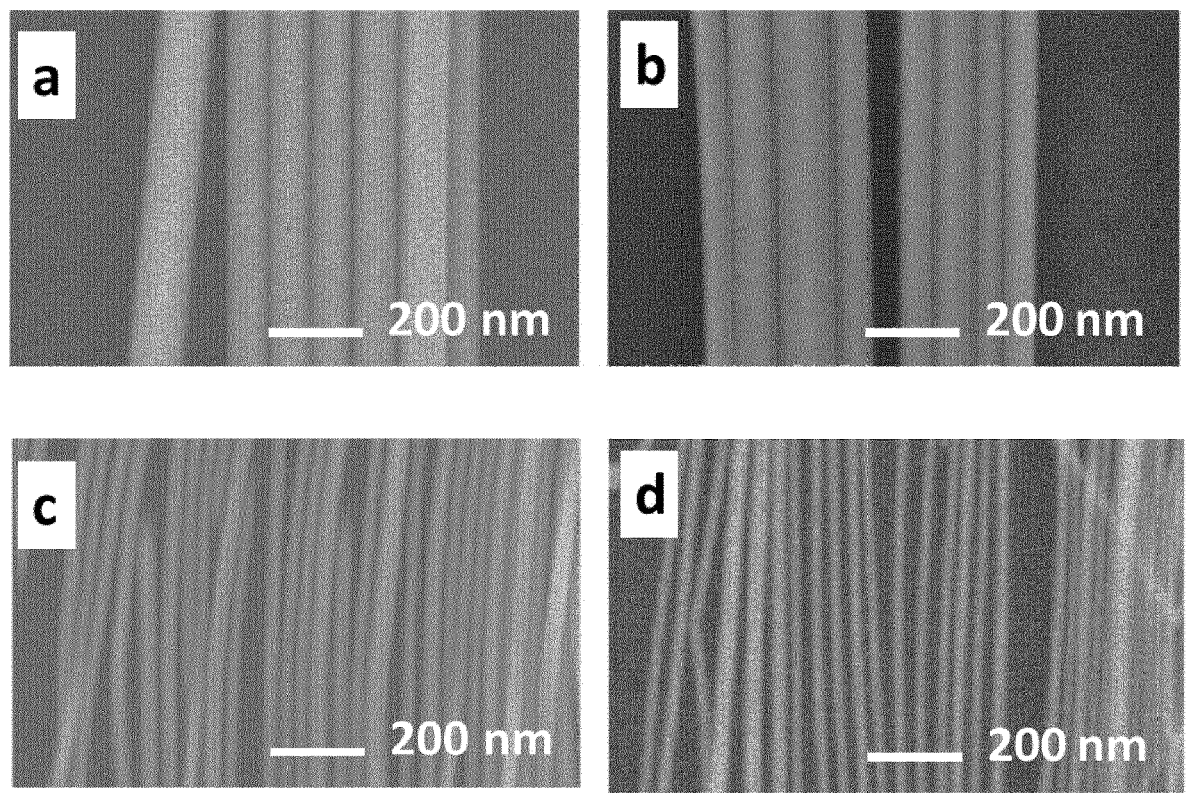

FIG. 3: High resolution SEM micrographs showing silver nanowires synthesized in example 2 in (a) reaction 4, (b) reaction 3, (c) reaction 2 and (d) reaction 1.

Figure 4:
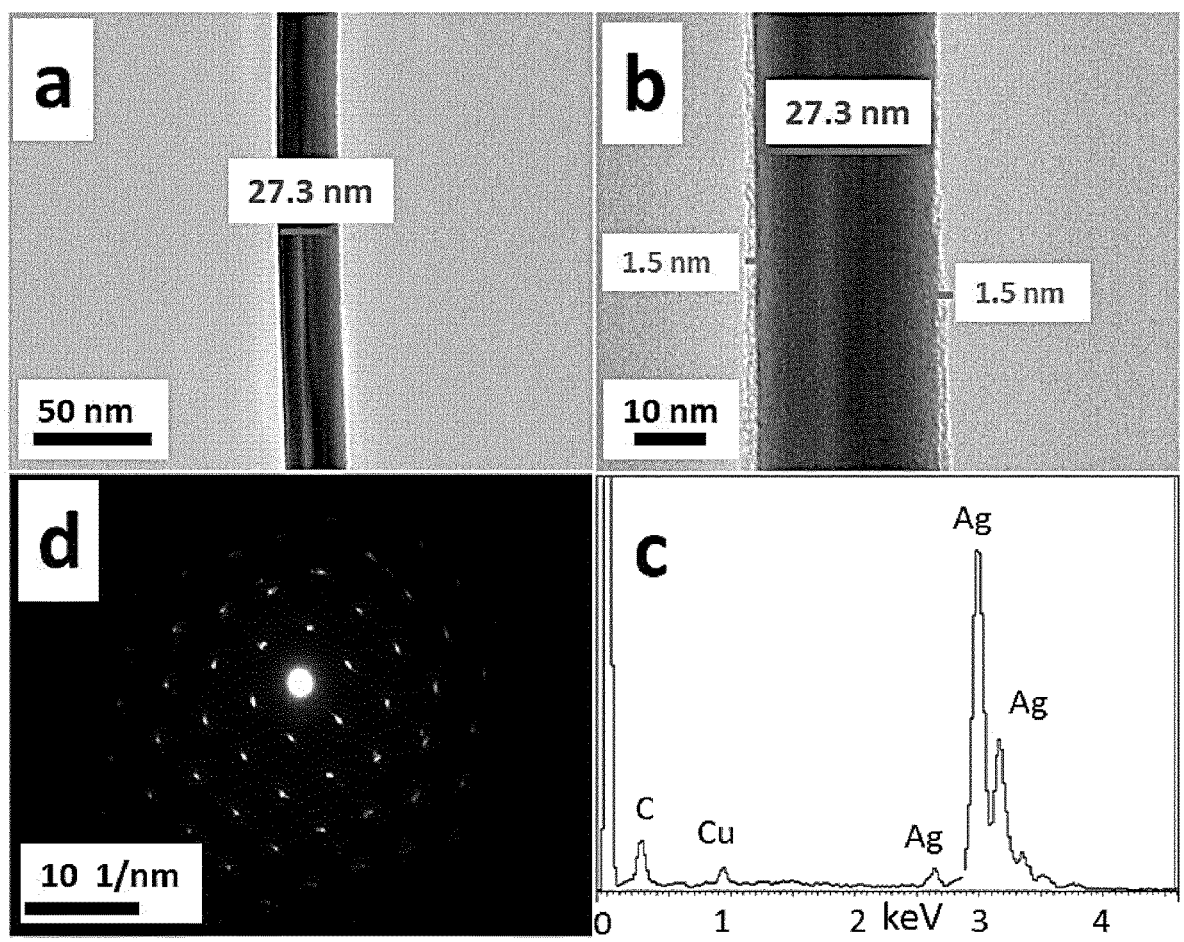

FIG. 4: (a) TEM micrograph of an individual silver nanowire of reaction 2 of example 2; (b) high resolution TEM micrograph of PVP (about 1.5 nm thickness) on the surface of a silver nanowire; (d) Electron diffraction pattern of a randomly selected silver nanowire; and (c) EDX spectrum of the silver nanowire.

Figure 5:
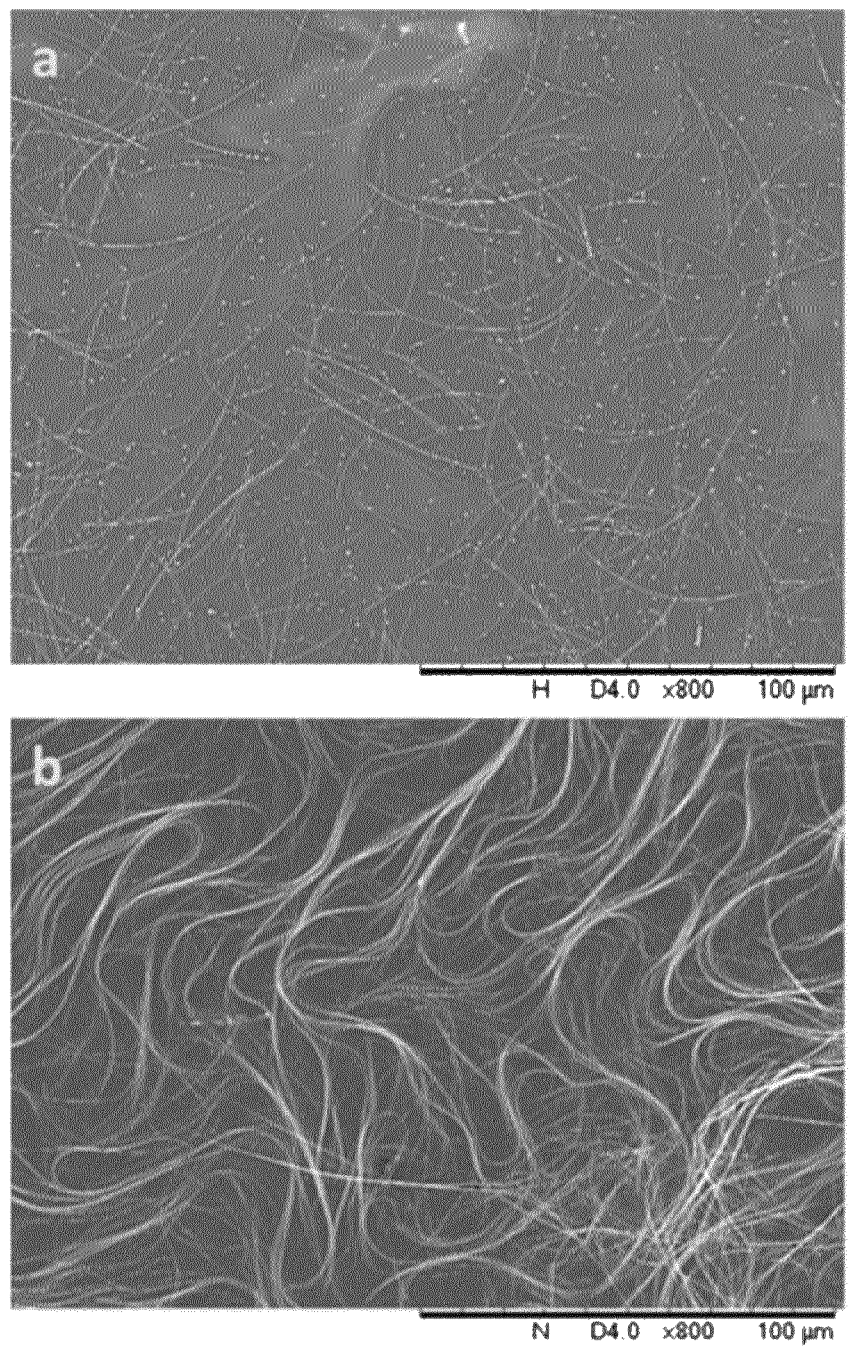

FIG. 5: SEM micrograph of silver nanowires of reaction 3 of Example 2 (a) before and (b) after a purification process.

DETAILED DESCRIPTION OF THE INVENTION

Unless defined otherwise, all technical and scientific terms used herein have the same meaning as commonly understood to one of ordinary skill in the art to which this disclosure belongs. As used herein, the singular forms "a" "an" and "the" include plural reference unless the context clearly dictates otherwise.

Method for the Preparation of Zero-Valent-Transition Metal Nanowires

As defined above, in a first aspect, the present invention refers to a method for the preparation of zero-valent-transition metal nanowires comprising the steps of:
i) providing a reaction mixture comprising: at least one capping agent, at least one transition metal salt, and at least one polar solvent;
ii) adding the reaction mixture obtained in step (i) to at least one reactor;
iii) heating the at least one reactor of step (ii) at a temperature between 30 and 300° C. for a period of time between 10 min and 7 days under a pressure of at least 100 KPa in a reactor oven to obtain a suspension comprising zero-valent-transition metal nanowires;
    wherein said at least one reactor comprises a longitudinal axis X-X' and performs at least one of the following movements:
    a translational movement following a path, and
    a rotational movement around the longitudinal axis X-X' or around an axis W-W' parallel to said longitudinal axis X-X'; and
iv) optionally performing a purification process of the suspension obtained in step (iii) to obtain a purified suspension comprising zero-valent-transition metal nanowires.

In the context of the present invention the term "nanowires" refers to nanostructures having thicknesses or diameters on the nanoscale. Non limiting examples of nanowires are nanorods, nanofibers, nanowhiskers and nanotubes. In the context of the present invention the expression "zero-valent-transition metal nanowires" relates to nanowires that comprise a zero-valent-transition metal in their composition; preferably a zero-valent transition metal selected from Ag, Cu, Au, Pt, Pd, Co, Zn, Cd, Pb and combinations thereof; more preferably selected from Ag, Au, Cu, Pd and Pt; even more preferably selected from Ag, Cu and Pt and even more preferably Ag.

In the context of the present invention the expression "method for the preparation of zero-valent-transition metal nanowires" comprises the preparation of a suspension comprising zero-valent-transition metal nanowires, a purified suspension comprising zero-valent-transition metal nanowires, slurries comprising zero-valent-transition metal nanowires and/or solids comprising dry zero-valent-transition metal nanowires.

In the context of the present invention the expressions "nanowires thickness" and "nanowires diameter" are synonyms. In the context of the present invention the expression "nanowire diameter" or "nanowire diameters" relates to the shorter dimension of a nanowire. In the context of the present invention the expression "nanowire length" or "nanowire lengths" relates to the longer dimension of a nanowire.

In the context of the present invention the expression "aspect ratio" relates to the ratio of the nanowires sizes in different dimensions. As a non-limiting example the aspect ratio of a zero-valent-transition metal nanowire is the ratio of its longer side or its length to its shorter side or its diameter or thickness, i.e. if a zero-valent-transition metal nanowire has a length of 40000 nm and a diameter of 20 nm, its aspect ratio is 2000.

In a particular embodiment, the method of the present invention is a method for the preparation of zero-valent-transition metal nanowires as defined above; wherein the zero-valent-transition metal is selected from Ag, Cu, Au, Pt, Pd, Co, Zn, Cd, Pb and combinations thereof; preferably wherein the zero-valent-transition metal is selected from Ag, Au, Cu, Pd and Pt; more preferably wherein the zero-valent-transition metal is selected from Ag, Cu and Pt; and even more preferably wherein the zero-valent-transition metal is Ag.

In a particular embodiment, the method as defined above is a method for the preparation of silver-metal nanowires, preferably crystalline silver-metal nanowires.

In a preferred embodiment, the zero-valent-transition metal nanowires of the method for the preparation of zero-valent-transition metal nanowires as defined above are Ag, Cu, Au, Pt, Pd, Co, Zn, Cd, Pb nanowires and combinations thereof; preferably Ag, Au, Cu, Pd and Pt nanowires; more preferably Ag nanowires.

In a particular embodiment, the zero-valent-transition metal nanowires of the method for the preparation of zero-valent-transition metal nanowires as defined above have a diameter below 500 nm; preferably below 100 nm; more preferably below 50 nm; even more preferably below 20 nm.

In a particular embodiment, the zero-valent-transition metal nanowires of the method for the preparation of zero-valent-transition metal nanowires as defined above, have a length above 5 microns, preferably between 5 and 300 microns, more preferably between 10 and 200 microns.

In a particular embodiment, the zero-valent-transition metal nanowires of the method for the preparation of zero-valent-transition metal nanowires as defined above, have an aspect ratio between 100 and 5000, preferably between 300 and 2000.

In a particular embodiment, the zero-valent-transition metal nanowires of the method for the preparation of zero-valent-transition metal nanowires as defined above are crystalline zero-valent-transition metal nanowires; preferably singly twinned crystalline zero-valent-transition metal nanowires; more preferably singly twinned crystalline silver nanowires.

In the contexts of the present invention the expression "singly twinned" refers to crystalline zero-valent-transition metal nanowires wherein two separate crystals share some of the same crystal lattice points in a symmetrical manner.

In a particular embodiment, the zero-valent-transition metal nanowires of the method for the preparation of zero-valent-transition metal nanowires as defined above have a polygonal structure.

In a particular embodiment, the zero-valent-transition metal nanowires of the method for the preparation of zero-valent-transition metal nanowires as defined above comprise a capping agent layer on their surface; preferably a PVP capping agent layer on their surface.

The method of the present invention for the preparation of zero-valent-transition metal nanowires comprises a step (i) of providing a reaction mixture comprising: at least one capping agent, at least one transition metal salt, and at least one polar solvent.

The term "capping agent" refers to a organic molecule which is able to form a strongly absorbed monolayer on the surface of nanostructures to facilitate their anisotropic growth and prevent the nanostructures from aggregation.

Examples of capping agents suitable for the method of the present invention include without limitation polymers and copolymers thereof of polyvinylpyrrolidone (PVP), polyacrylamide (PAA), polyvinyl butyral (PVB) or polyacrylic (PA), cetyltrimethylammonium bromide (CTAB), Vitamin C, Vitamin B, dodecyl benzene sulfonic acid (DBS), tetrabutyl ammonium bromide (TBAB), sodium dodecylsulfonate (SDS) and combinations thereof.

In a preferred embodiment, the at least one capping agent of step (i) is polyvinylpyrrolidone (PVP).

Polyvinylpyrrolidone (PVP) is a polymer with different average molecular weight. Examples of average molecular weights of PVP suitable for the method of the present invention include, without limitation 55,000, 360,000, 1,300,000 and the like.

In a preferred embodiment, the at least one capping agent is PVP having an average molecular weight above 300000 (PVP-K300).

The expression "transition metal salt" refers to a neutral compound having a positively charged metal ion and a negatively charged counterion. The counterion could be organic or inorganic. Exemplary transition metal salts include, without limitation transition metal nitrates, transition metal chlorides, transition metal perchlorates, transition metal acetates and the like.

In a preferred embodiment, the at least one transition metal salt is selected from a zero-valent transition metal selected from an Ag, Cu, Au, Pt, Pd, Co, Zn, Cd, Pb salt and combinations thereof, preferably selected from Ag, Au, Cu, Pd and Pt salt; preferably selected from Ag, Cu and Pt salt.

In a preferred embodiment, the at least one transition metal salt is a silver salt. Exemplary silver salts include, without limitation silver nitrate ($AgNO_3$), silver chloride (AgCl), silver perchlorate ($AgClO_4$), silver acetate $CH_3CO_2Ag$ (or $AgC_2H_3O_2$) and the like.

In a preferred embodiment, the at least one transition metal salt of step (i) is silver nitrate ($AgNO_3$).

In a preferred embodiment, the reaction mixture obtained in step (i) has a capping agent:transition metal salt molar ratio between 0.1 and 10; preferably between 1 and 7, more preferably between 1.5 and 4.5.

Normally, the silver salt is soluble in the at least one polar solvent and dissociates into oppositely charged silver ion and counterion. Reduction of the silver salt in the solvent produces elemental silver. The elemental silver crystallizes or grows into a one-dimensional nanostructure, i.e. nanowires. The at least one capping agent such as PVP or the at least one polar solvent can also have reducing properties and act as a reducing agent i.e. reducing silver ions to elemental silver.

In a particular embodiment, the reaction mixture of step (i) further comprises at least one reducing agent.

In a more particular embodiment, the at least one reducing agent and the at least one polar solvent of the reaction mixture of step (i) are ethylene glycol (EG).

The term "polar solvent" refers to a solvent with ability to solve the at least one transition metal salt and the at least one capping agent. Normally, the polar solvent is a chemical reagent by having at least two hydroxyl groups such as diols, polyols, glycols, or mixtures thereof. Exemplary polar solvents suitable for the method of the present invention include without limitation ethylene glycol, glycerol, glucose, glycerin, 1,2-propylene glycol, 1,3-propylene glycol and mixtures thereof.

In a preferred embodiment, the at least one polar solvent of step (i) is ethylene glycol (EG).

In a particular embodiment the reaction mixture of step (i) further comprises an at least one additive salt.

In a more particular embodiment the reaction mixture of step (i) further comprises an at least two additive salts.

The term "additive salt" or "ionic additive" refers to a salt containing cationic and anionic species associated by ionic interactions which can easily dissociate in polar solvents such as water, alcohol, diols and polyols (including ethylene glycol, glycerol, glucose, glycerin, 1,2 propylene glycol and 1,3-propylene glycol). The cation can be organic, including ammonium cation ($NH_4^+$) or proton ($H^+$), or inorganic. The anions are typically inorganic. Exemplary anions include, without limitation: Halides ($Cl^-$, $Br^-$, $I^-$, $F^-$), hydrogen sulfate ($HSO_4^-$), sulfate ($SO_4^{-2}$), phosphate ($PO_4^{-3}$), sulfonates ($RSO_3^-$), aryl, alkyl and the like.

The term "ammonium salt" refers to a salt formed by a quaternary ammonium cation ($NH_4^+$) in which each of the four hydrogens can be replaced by organic groups. Therefore, the substituted quaternary ammonium cation is typically shown by formula ($NR_4^+$), wherein each R is the same or different and independently an alkyl, alkenyl, alkynyl, aryl and etc. The quaternary ammonium cation can create quaternary ammonium salt by different anions.

Exemplary anions include, without limitation halides ($Cl^-$, $Br^-$, $I^-$, $F^-$), hydrogen sulfate ($HSO_4^-$), sulfate ($SO_4^{-2}$), phosphate ($PO_4^{-3}$), sulfonates ($RSO_3^{-3}$), aryl, alkyl and the like.

Exemplary quaternary ammonium salts include, without limitation tetra propyl ammonium chloride (TPA-C), tetra propyl ammonium bromide (TPA-B), 1-butyl-3-methyl imidazolium chloride (BMIM-Cl), 1-butyl-3-methyl imidazolium chloride (BMIM-Br) and combinations thereof.

In a particular embodiment, the reaction mixture of step (i) further comprises an at least one additive salt; wherein the at least one additive salt of step (i) is selected from KCl, KBr, NaCl and NaBr and combinations thereof.

In a preferred embodiment, the reaction mixture of step (i) further comprises an at least one additive salt; wherein the at least one additive salt of step (i) is selected from KCl, KBr, NaCl, KBr and an ammonium salt selected from the group of TPA-B, TPA-C and BMIM-Cl, and combinations thereof.

In a more preferred embodiment, the reaction mixture of step (i) further comprises an at least one additive salt; wherein the at least one additive salt of step (i) is selected from KBr and TPA-C and combinations thereof.

In a more preferred embodiment, the reaction mixture of step (i) further comprises a combination of TPA-C and KBr.

In a more preferred embodiment, the reaction mixture of step (i) further comprises NaCl.

In a more preferred embodiment, the reaction mixture of step (i) further comprises BMIN-Cl.

Without being bound to any theory in particular, the authors of the present invention believe that by changing the additive salts used in step (i) of the method of the present invention the zero-valent-transition metal nanowires obtained characteristics such as average diameter or length range can be tuned.

In a preferred embodiment, the reaction mixture obtained in step (i) further comprises two additive salts, provided that at least one of said two additive salts is an ammonium salt, and wherein the molar concentration ratio of the ammonium salt to the other additive salt is in the range of 0.5-5; preferably in the range of 1-3.

In an even more preferred embodiment, the reaction mixture obtained in step (i) comprises KBr and TPA-C; wherein the KBr/TPA-C molar ratio is between 0.5 and 5, preferably between 1 and 3, more preferably between 1.5 and 2.5.

In the context of the present invention the expression "reaction mixture" refers to a combination of different substances in which a reaction can occur at certain conditions (for example at certain pressure or temperature) particularly to obtain a suspension comprising zero-valent-transition metal nanowires.

In a particular embodiment the method for the preparation of zero-valent-transition metal nanowires further comprises:
providing
a solution of at least one capping agent in at least one polar solvent; and
a solution of at least one transition metal salt in at least one polar solvent; and
mixing the solution of at least one capping agent in at least one polar solvent and the solution of at least one transition metal salt in at least one polar solvent to form a reaction mixture comprising: at least one capping agent, at least one transition metal salt, and at least one polar solvent.

In a more particular embodiment the method for the preparation of zero-valent-transition metal nanowires further comprises:
providing
a solution of at least one capping agent in at least one polar solvent;
a solution of at least one transition metal salt in at least one polar solvent; and
a solution of at least one additive salt optionally in at least one polar solvent; and
adding to the solution of at least one capping agent in at least one polar solvent, the solution of at least one additive salt in at least one polar solvent and then the solution of at least one transition metal salt in at least one polar solvent to form a reaction mixture comprising at least one capping agent, at least one transition metal salt, at least one additive salt and at least one polar solvent.

In an even more particular embodiment the solution of at least one capping agent in at least one polar solvent is prepared by heating the at least one capping agent in the at least one polar solvent and afterwards cooling down.

As no limitative example, PVP as capping agent can be completely dissolved in ethylene glycol as polar solvent heating at 80-120° C. for 2 hours.

In an even more particular embodiment the solution of at least one transition metal salt in at least one polar solvent is prepared at room temperature by stirring.

In an even more particular embodiment the solution of at least one additive salt in at least one polar solvent is prepared at room temperature by stirring.

The method of the present invention for the preparation of zero-valent-transition metal nanowires comprises a step (ii) of adding the reaction mixture obtained in step (i) to at least one reactor.

In the context of the present invention the term "reactor" refers to a high temperature and pressure resistance reactor for synthesis processes. During the reaction, the pressure inside the reactor can be increased by applying an outer pressure to the reactor or by gas or vapor generated from the reaction in the reactor. Non-limitative examples of reactors suitable for the method of the present invention are solvothermal reactors or hydrothermal reactors such as sealed autoclaves. In a particular embodiment, the at least one reactor of step (ii) is able to hold pressure at between 1 and 500 kPa; preferably between 100 and 400 kPa; more preferably at between 100 and 200 kPa.

In a particular embodiment, the at least one reactor of step (ii) is a solvothermal reactor.

In a more particular embodiment the at least one reactor of step (ii) comprises at least one chemically inert material and at least one thermally conductive material.

In a more particular embodiment the at least one reactor of step (ii) comprises
a. at least one chemically inert material selected from polytetrafluoroethylene (PTFE), ceramic, silica and combinations thereof; and
b. at least one thermally conductive material selected from stainless steel, aluminum, copper, bronze, chromium, brass, beryllium and combinations thereof.

Examples of solvothermal reactors suitable for the method of the present invention include without limitation PTFE-lined stainless steel reactors, PTFE-coated aluminum reactors and the like.

In a preferred embodiment, the at least one reactor of step (ii) is selected from PTFE-lined stainless steel reactor and PTFE-coated aluminum reactor, preferably is a PTFE-coated aluminum reactor.

In a particular embodiment, the at least one reactor of step (ii) is a PTFE-coated aluminum reactor comprising an internal PTFE coating layer between 50 and 500 microns.

In a particular embodiment, the at least one reactor of step (ii) is a PTFE-coated aluminum reactor having an external aluminum layer between of 0.1 and 5 mm.

In a particular embodiment, the at least one reactor of step (ii) has a capacity between 25 ml and 10000 ml, preferably between 500 ml and 5000 ml; more preferably between 1000 and 3000 ml.

Without being bound to any theory in particular, the authors of the present invention believe that the use of at least one PTFE-coated aluminum reactor in the method of the present invention allows obtaining high yield zero-valent-transition metal nanowires having a uniform and controlled aspect ratio.

Additionally, the authors of the present invention believe that the method of the present invention is able to use several solvothermal reactors with higher capacity and therefore is able for scaling up.

The method of the present invention for the preparation of zero-valent-transition metal nanowires comprises a step (iii) of heating the at least one reactor of step (ii) at a temperature between 30 and 300° C. for a period of time between 10 min and 7 days under a pressure of at least 100 KPa in a reactor oven to obtain a suspension comprising zero-valent-transition metal nanowires;
wherein said at least one reactor comprises a longitudinal axis X-X' and performs at least one of the following movements:
a translational movement following a path, and
a rotational movement around the longitudinal axis X-X' or around an axis W-W' parallel to said longitudinal axis X-X'.

In a particular embodiment, the step (iii) of the method for the preparation of zero-valent-transition metal nanowires as defined above further comprises heating the at least one reactor of step (ii) at a temperature between 30 and 300° C., preferably between 100 and 200° C., more preferably between 120 and 180° C.

In a particular embodiment the step (iii) of the method for the preparation of zero-valent-transition metal nanowires as defined above further comprises heating the at least one reactor of step (ii) for a period of time between 10 min and 7 days, preferably between 1 hour and 50 hours, more preferably between 2 hours and 40 hours.

In a particular embodiment the step (iii) of the method for the preparation of zero-valent-transition metal nanowires as defined above further comprises heating the at least one reactor of step (ii) under a pressure of at least 100 KPa, preferably of at least 120 KPa, more preferably of at least 140 KPa. In a particular embodiment the step (iii) of the method for the preparation of zero-valent-transition metal nanowires as defined above further comprises a pressure of between 1 and 1000 kPa; preferably between 1 and 500 kPa; more preferably between 100 and 400 kPa; even more preferably between 100 and 200 kPa. The term "kPa" or 2 KPa" in understood as the unit of pressure kilopascal as kwon in the art (i.e. 1 Pa in SI base units is equal to $Kg*m^{-1}*s^{-2}$).

In a more particular embodiment the step (iii) of the method for the preparation of zero-valent-transition metal nanowires as defined above further comprises heating the at least one reactor of step (ii) at a temperature between 100 and 200° C. for a period of time between 1 hour and 50 hour under a pressure of at least 120 KPa in a reactor oven to obtain a suspension comprising zero-valent-transition metal nanowires;
wherein said at least one reactor comprises a longitudinal axis X-X' and at least one of the following movements:
a translational movement following a path, and
a rotational movement around the longitudinal axis X-X' or around an axis W-W' parallel to said longitudinal axis X-X.

In an even more particular embodiment the step (iii) of the method for the preparation of zero-valent-transition metal nanowires as defined above further comprises heating the at least one reactor of step (ii) at a temperature between 120 and 190° C. for a period of time between 2 hour and 40 hour under a pressure of at least 140 KPa in a reactor oven to obtain a suspension comprising zero-valent-transition metal nanowires;
wherein said at least one reactor comprises a longitudinal axis X-X' and performs at least one of the following movements:
a translational movement following a path, and
a rotational movement around the longitudinal axis X-X' or around an axis W-W' parallel to said longitudinal axis X-X.

In a particular embodiment, the step (iii) of the method for the preparation of zero-valent-transition metal nanowires as defined above further comprises heating the at least one reactor of step (ii) at a temperature between 120 and 190° C.;
wherein said heating the at least one reactor of step (ii) comprises the following steps:
a. heating the at least one reactor from an initial temperature to a final temperature between 120 and 190° C.;
b. maintaining a temperature between 120 and 190° C. for a period of time;
c. optionally performing a combination of steps a) and b); and/or
d. dropping the temperature to room temperature.

In the context of the present invention the expression "room temperature" refers to a temperature between 15 degrees Celsius (° C.) and 25° C.

In a particular embodiment, the step (iii) of the method for the preparation of zero-valent-transition metal nanowires as defined above further comprises heating the at least one reactor of step (ii) at a temperature between 120 and 190° C.;
wherein said heating the at least one reactor of step (ii) comprises the following steps:
a. heating the at least one reactor from an initial temperature to a final temperature between 120 and 190° C.;
b. maintaining a temperature value between 120 and 190° C. for a period of time between 5 and 50 hours;

c. optionally performing a combination of steps a) and b); and and/or d. dropping the temperature to room temperature.

The method of the present invention for the preparation of zero-valent-transition metal nanowires comprises a step (iii) of heating the at least one reactor of step (ii); wherein said at least one reactor comprises a longitudinal axis X-X' and performs at least one of the following movements:

a translational movement following a path, and a rotational movement around the longitudinal axis X-X' or around an axis W-W' parallel to said longitudinal axis X-X'.

In a particular embodiment, the at least one reactor of step (iii) of the method for the preparation of zero-valent-transition metal nanowires performs at least a rotational movement around the longitudinal axis X-X' or around an axis W-W' parallel to said longitudinal axis X-X'.

In a particular embodiment the at least one reactor of step (iii) of the method for the preparation of zero-valent-transition metal nanowires simultaneously performs a rotational movement around the longitudinal axis X-X' or around an axis W-W' parallel to said longitudinal axis X-X', and a translational movement following a path.

In the context of the present invention the expression "translational movement" relates to a shift from one point in space to another. Non limiting examples of translational movement are the shift of the at least one reactor of the present invention from one point in space to another following a linear, loop, orbital, elliptical, or circular path and/or combinations thereof.

In the context of the present invention the term "path" refers to a route or track followed by the at least one reactor of the present invention while performing a translational movement. Non limiting examples of a path suitable for the method of the present invention include without limitation a linear, loop, orbital, elliptical, or circular path and/or combinations thereof.

In the context of the present invention the term "closed-path" refers to a route or track followed by the at least one reactor of the present invention while performing a translational movement that starts and ends at the same point in space. Non limiting examples of a closed-path suitable for the method of the present invention include without limitation a linear, loop, orbital, elliptical, or circular path and/or combinations thereof.

In the context of the present invention the expression "rotational movement" relates to the movement around an axis or center (or point) of rotation, i.e. the number of rotations around a rotation axe. Non limiting examples of rotation axes suitable for the method of the present invention include without limitation a longitudinal axis X-X' of the at least one reactor of the present invention and an axis W-W' parallel to said longitudinal axis X-X'. Non limiting examples of rotational movements are concentric or eccentric movements around a rotation axe.

In the context of the present invention the expression "a longitudinal axis X-X'" relates to a longitudinal axis of rotation of a reactor parallel to its length that passes through its center and constitutes a symmetry axis. As a non-limiting example, for a cylindrical reactor its longitudinal axis X-X' is parallel to its length and passes through its center.

In a particular embodiment the translational movement of step (iii) of the method of the present invention is a uniform translational movement.

In a particular embodiment the rotational movement of step (iii) of the method of the present invention is a uniform rotational movement.

In the context of the present invention the expression "uniform movement" refers to a movement at a constant speed (wherein the velocity remains constant) i.e. with no acceleration, in particular to a movement at a constant speed of the at least one reactor of the present invention.

In the context of the present invention the term "rpm" is a measure of the frequency; wherein i) regarding the translational movement following a closed-path, "rpm" relates to the number of complete closed-paths performed in a period of time (a minute); and ii) regarding the rotational movement, "rpm" relates to the number of complete rotations performed in a period of time around the longitudinal axis X-X' or around an axis W-W' parallel to said longitudinal axis X-X'. As a non-liming example "rpm" is a measure of frequency that relates to the number of times that the at least one reactor of the present invention completes a closed-path in a minute while performing a translational movement following a closed-path or ii) to the number of times that the at least one reactor rotates around its longitudinal axis X-X' or around an axis W-W' parallel to said longitudinal axis X-X' while performing a rotational movement.

In a particular embodiment the at least one reactor of step (iii) performs the translational movement following a linear path.

In a particular embodiment the at least one reactor of step (iii) performs the translational movement following a linear path at a constant speed between 0.1 and 10 m/min.

In a particular embodiment the at least one reactor of step (iii) performs the translational movement following a closed-path.

Examples of a closed-path suitable for the method of the present invention include, without limitation a loop, orbital, elliptical or circular closed-path and/or combinations thereof.

In a particular embodiment either the translational movement following a closed-path or the rotational movement of step (iii) are performed at a constant frequency between 1 and 100 rpm; more preferably at a constant frequency between 1 and 50 rpm.

In a more particular embodiment the at least one reactor of step (iii) performs the translational movement following a closed-path at a constant frequency between 1 and 100 rpm, preferably at a constant frequency between 1 and 50 rpm, more preferably at a constant frequency between 1 and 10 rpm.

In a particular embodiment the at least one reactor of step (iii) performs the translational movement following a circular closed-path around an axis Y-Y' parallel to said longitudinal axis X-X'.

In a more particular embodiment the at least one reactor of step (iii) performs the translational movement following a circular closed-path around an axis Y-Y' parallel to said longitudinal axis X-X' at a constant frequency between 1 and 100 rpm, preferably at a constant frequency between 1 and 50 rpm, more preferably at a constant frequency between 1 and 10 rpm.

In a particular embodiment the at least one reactor of step (iii) performs the translational movement following an elliptical closed-path around an axis Y-Y' parallel or perpendicular to said longitudinal axis X-X'.

In a more particular embodiment the at least one reactor of step (iii) performs the translational movement following an elliptical closed-path around an axis Y-Y' parallel to said longitudinal axis X-X'.

In a more particular embodiment the at least one reactor of step (iii) performs the translational movement following an elliptical closed-path around an axis Y-Y' perpendicular to said longitudinal axis X-X'.

In a more particular embodiment the at least one reactor of step (iii) performs the translational movement following an elliptical closed-path around an axis Y-Y' parallel to said longitudinal axis X-X' at a constant frequency between 1 and 100 rpm, preferably at a constant frequency between 1 and 50 rpm, more preferably at a constant frequency between 1 and 10 rpm.

In a particular embodiment the at least one reactor performs the rotational movement around the longitudinal axis X-X' or around an axis W-W' parallel to said longitudinal axis X-X' at a constant frequency between 1 and 100 rpm, preferably at a constant frequency between 1 and 50 rpm.

Without being bound to any theory in particular, the authors of the present invention have surprisingly found that when the at least one reactor performs the translational movement following a path in step (iii) of the method of the present invention, the zero-valent-transition metal nanowires of the suspension obtained are homogenous and have an uniform aspect ratio among them. Also, when said at least one reactor is at least two reactors; the zero-valent-transition metal nanowires obtained in the suspension obtained in each of the at least two reactors are homogeneous and have a uniform aspect ratio among them.

Without being bound to any theory in particular, the authors of the present invention have surprisingly found that when the at least one reactor having a longitudinal axis X-X' performs the rotational movement around an axis W-W' parallel to said longitudinal axis X-X'; in step (iii) of the method of the present invention, the zero-valent-transition metal nanowires of the suspension obtained have a higher aspect ratio than when the at least one reactor does not perform a rotational movement. In particular, when the at least one reactor performs the rotational movement at around 50 rpm the zero-valent-transition metal nanowires of the suspension obtained have a higher length. Therefore, the authors of the present invention have surprisingly found that the aspect ratio of the zero-valent-transition metal nanowires can be modulated by changing the rotational movement conditions.

Without being bound to any theory in particular, the authors of the present invention have surprisingly found that when the at least one reactor having a longitudinal axis X-X' performs the rotational movement around said longitudinal axis X-X' the length range of the zero-valent-transition metal nanowires became narrower, i.e. the zero-valent-transition metal nanowires are more uniform.

In a particular embodiment the at least one reactor of the method of the present invention is at least two reactors.

In a particular embodiment the at least one reactor of the method of the present invention is at least two reactors; and wherein said at least two reactors perform the translational movement following a path, and the rotational movement around an axis W-W' parallel to said longitudinal axis X-X'.

In a particular embodiment the at least one reactor of the method of the present invention is at least two reactors; and wherein said at least two reactors perform simultaneously the translational movement following a path, and the rotational movement around an axis W-W' parallel to said longitudinal axis X-X'.

In a more particular embodiment the at least one reactor of the method of the present invention is at least three reactors.

In a particular embodiment the at least one reactor of the method of the present invention is at least three reactors; and wherein said at least three reactors perform the translational movement following a path, and the rotational movement around an axis W-W' parallel to said longitudinal axis X-X'.

In a particular embodiment the at least one reactor of the method of the present invention is at least three reactors; and wherein said at least three reactors perform simultaneously the translational movement following a path, and the rotational movement around an axis W-W' parallel to said longitudinal axis X-X'.

In a particular embodiment, the at least one reactor is heated by means of a reactor oven.

In a particular embodiment the step (iii) of the method for the preparation of zero-valent-transition metal nanowires as defined above further comprises a reactor oven; wherein said reactor oven comprises:
- a thermally insulated chamber, comprising at least one entry and temperature control means;
- a conveyor adapted to perform the translational movement following a path; and
- at least one rotating platform located on the conveyor;
- wherein said rotating platform is adapted to perform the rotational movement around the longitudinal axis X-X' or around the axis W-W' parallel to said longitudinal axis X-X'; and
- wherein the at least one reactor is located on the rotating platform.

In a more particular embodiment the step (iii) of the method for the preparation of zero-valent-transition metal nanowires as defined above further comprises a reactor oven (1); wherein said reactor oven (1) comprises:
- a thermally insulated chamber (1.1), comprising at least an entry (1.2) and temperature control means;
- a conveyor (2) adapted to perform a translational movement following a path;
- at least one rotating platform (3) located on the conveyor (2); and
- at least one reactor (4) located on the rotating platform (3); wherein said at least one reactor (4) comprises a longitudinal axis X-X'; and
- wherein said rotating platform (3) is adapted to perform a rotational movement around the longitudinal axis X-X' or around an axis W-W' parallel to said longitudinal axis X-X'; and
- wherein the at least one reactor (4) is located on the rotating platform;
- preferably as shown in FIG. 1.

In the context of the present invention the expression "thermally insulated chamber" refers to a chamber that keeps a relative constant temperature inside. Said thermally insulated chamber optionally comprises means to transfer thermal energy by convection and radiation. In addition, said chamber may be able to hold pressure or suitable for holding pressure; preferably pressure between 1 and 500 kPa; more preferably between 100 and 200 kPa.

In the context of the present invention the expression "temperature control means" refers to means able to maintaining a constant temperature inside the thermally insulated chamber over a period of time, and/or changing the temperature from an initial value to a final value over a period of time inside the thermally insulated chamber and optionally comprise temperature sensor means.

In the context of the present invention the term "conveyor" refers to a common piece of mechanical handling equipment that moves materials from one location to another following a path and is adapted to complete a certain number of paths in a period of time.

In a more particular embodiment the conveyor comprises a least one load carrying surface.

In a more particular embodiment the conveyor comprises a double traction element specially adapted to follow a curved path such as a circular path.

In the context of the present invention the expression "rotating platform" refers to a platform adapted to rotate around a fixed axis wherein said platform is adapted to perform a certain number of rotations in a period of time.

In a particular embodiment the rotating platform of the present invention comprises a reactor holder; preferably a reactor holder suitable for holding pressure at between 1 and 500 kPa; more preferably at between 100 and 200 kPa.

In a particular embodiment the reactor oven of the step (iii) of the method for the preparation of zero-valent-transition metal nanowires as defined above further comprises a natural convention reactor oven, a forced air reactor oven or combinations thereof.

In a particular embodiment the reactor oven of the step (iii) of the method for the preparation of zero-valent-transition metal nanowires as defined above further comprises means for air circulation.

In the context of the present invention, means for air circulation are for example a fan that accelerates the heat transfer (convection) and air exchange inside the thermally insulated chamber of the reactor oven of the present invention and distributes the temperature homogeneously within the thermally insulated chamber.

In a particular embodiment, the reactor oven of the step (iii) of the method for the preparation of zero-valent-transition metal nanowires as defined above further comprises the at least one rotating platform adapted to perform the rotational movement around the longitudinal axis X-X' or around the axis W-W' parallel to said longitudinal axis X-X simultaneously with the translational movement following a path of the conveyor.

In a particular embodiment, the reactor oven of the step (iii) of the method for the preparation of zero-valent-transition metal nanowires as defined above further comprises the conveyor adapted to perform a translational movement following a linear path at a constant speed between 0.1 and 1 m/min, preferably at between 0.2 and 0.80 m/min, more preferably at between 0.3 and 0.6 m/min.

In a particular embodiment, the reactor oven of the step (iii) of the method for the preparation of zero-valent-transition metal nanowires as defined above further comprises the conveyor adapted to perform a translational movement following a closed-path at a constant frequency between 1 and 100 rpm, preferably at a constant frequency between 1 and 50 rpm, more preferably at a constant frequency between 1 and 10 rpm.

In a particular embodiment, the reactor oven of the step (iii) of the method for the preparation of zero-valent-transition metal nanowires as defined above further comprises the at least one rotating platform of the reactor oven adapted to perform a rotational movement around the longitudinal axis X-X' or around an axis W-W' parallel to said longitudinal axis X-X' at a constant frequency between 1 and 100 rpm, preferably at a constant frequency between 1 and 60 rpm, more preferably at 50 rpm.

In a particular embodiment the reactor oven of the step (iii) of the method for the preparation of zero-valent-transition metal nanowires as defined above further comprises either the at least one rotating platform of the reactor oven adapted to perform a rotational movement around the longitudinal axis X-X' or around an axis W-W' parallel to said longitudinal axis X-X' or the conveyor adapted to perform a translational movement following a closed-path at a constant frequency between 1 and 100 rpm; more preferably at a constant frequency between 1 and 50 rpm.

In a particular embodiment the reactor oven of the step (iii) of the method for the preparation of zero-valent-transition metal nanowires as defined above further comprises the at least one reactor located on the rotating platform.

In a particular embodiment the reactor oven of the step (iii) of the method for the preparation of zero-valent-transition metal nanowires as defined above further comprises the at least one reactor located on the center of the rotating platform.

In a particular embodiment the reactor oven of the step (iii) of the method for the preparation of zero-valent-transition metal nanowires as defined above further comprises at least two reactors are located on the at least one rotating platform.

In a particular embodiment the reactor oven of the step (iii) of the method for the preparation of zero-valent-transition metal nanowires as defined above further comprises at least two reactors located on the at least one rotating platform at a similar distance to the center of the platform.

In a particular embodiment the reactor oven of the step (iii) of the method for the preparation of zero-valent-transition metal nanowires as defined above further comprises at least two reactors located on the at least one rotating platform at a similar distance to the center of the platform; wherein said distance is less than twice the external diameter of the reactor, preferably between 1 and 1000 cm from the center of the rector to the center of the platform, more preferably between 2 and 35 cm from the center of the rector to the center of the rotating platform.

In the contexts of the present invention the expression "located on" in relation with the at least one reactor or with the at least two reactors located on the at least one rotating platform is related to said reactors being placed and fixed at a certain point on said at least one rotating platform. As non-limiting examples:

when one reactor comprising a longitudinal axis X-X' is located on the center of the rotating platform, the one reactor is able to perform a rotational movement around the longitudinal axis X-X';

when one reactor comprising a longitudinal axis X-X' is located at a distance to the center of the rotating platform, wherein said distance is less than twice the external diameter of the reactor, the one reactor is able to perform a rotational movement around an axis W-W' parallel to said longitudinal axis X-X'; and when at least two reactors comprising a longitudinal axis X-X' are located at a similar distance to the center of the rotating platform, wherein said distance is less than twice the external diameter of the at least two reactors, the at least two reactors are able to perform a rotational movement around an axis W-W' parallel to said longitudinal axis X-X'.

In a more particular embodiment the reactor oven of the step (iii) of the method for the preparation of zero-valent-transition metal nanowires as defined above located on the at least one rotating platform at a distance to the center of the rotating platform; wherein said at least one reactor is able to perform an eccentric rotation around the axis W-W' parallel to said longitudinal axis X-X'.

In a more particular embodiment the reactor oven of the step (iii) of the method for the preparation of zero-valent-transition metal nanowires as defined above further comprises at least two reactors located on the at least one rotating platform at a similar distance to the center of the rotating platform; wherein said at least two reactors are able to perform an eccentric rotation around the axis W-W' parallel to said longitudinal axis X-X'.

In a more particular embodiment the reactor oven of the step (iii) of the method for the preparation of zero-valent-transition metal nanowires as defined above is suitable for holding pressure at between 100 and 200 kPa; preferably is a solvothermal or hydrothermal reactor as known in the art; more preferably comprises a sealed autoclave.

During the heating period of step (iii) the reaction mixture becomes more viscous and turbid, until the presence of a gray or green color indicates that the suspension comprises silver nanowires.

The method of the present invention for the preparation of zero-valent-transition metal nanowires comprises a step (iv) of optionally performing a purification process of the suspension obtained in step (iii) to obtain a purified suspension comprising zero-valent-transition metal nanowires.

In a particular embodiment the purification process of step (iv) of the method for the preparation of zero-valent-transition metal nanowires as defined above comprises a filtration process.

In a particular embodiment the purification process of step (iv) of the method for the preparation of zero-valent-transition metal nanowires as defined above comprises:
a. performing an angular filtration of the suspension of step (iv) to obtain a retentate comprising zero-valent-transition metal nanowires;
b. dispersing the retentate obtained in step (a) in a solvent to form a feed-flow comprising zero-valent-transition metal nanowires; and
c. performing a tangential-flow filtration of the feed-flow obtained in step (b) to obtain a purified suspension comprising zero-valent-transition metal nanowires; and
d. optionally, repeating steps from (a) to (c).

In a particular embodiment the purification process of step (iv) of the method for the preparation of zero-valent-transition metal nanowires as defined above further comprises repeating one or more of the steps from (a) to (c).

In the context of the present invention the term "purification" refers to the reduction of undesired materials in the purified suspension. In the context of the present invention the purified suspension comprises zero-valent-transition metal nanowires. Non limiting examples of undesired materials are solvents, nanoparticles such as zero-valent-transition metal nanoparticles, salts, capping agents and the like. Non limiting examples of zero-valent-transition metal nanoparticles are Ag, Cu, Au, Pt, Pd, Co, Zn, Cd, Pb nanoparticles and combinations thereof; preferably Ag, Au, Cu, Pd and Pt nanoparticles; more preferably Ag nanoparticles.

In the context of the present invention the term "retentate" refers to the material that is retained by the filter during a purification step. A non-limiting example of a retentate is a retained solid or slurry comprising zero-valent-transition metal nanowires.

In the context of the present invention the expression "feed-flow" refers to the flow that feeds the filtration unit and optionally enters through the inlet of the filtration unit.

In a particular embodiment the "feed-flow" of step (iv) is a suspension comprising zero-valent-transition metal nanowires.

In the context of the present invention the expression "filtration-flow" refers to the flow that exits the filtration unit after going thought the filter as permeate or filtrate and optionally exits through the outlet of the filtration unit. Non limiting examples of materials that can be comprised in the filtration-flow are solvents, ions and nanoparticles.

In the context of the present invention the expression "angular filtration" refers to a filtration process wherein the feed-flow and the filtration-flow direction form an angle between 90 and 180 degrees, preferably between 100 and 170 degrees.

In the context of the present invention the expression "tangential-flow filtration" or "cross-flow filtration" refers to a filtration wherein the feed flow and the filtration flow direction form an angle of about 90 degrees.

In a particular embodiment the purification process of step (iv) of the method for the preparation of zero-valent-transition metal nanowires as defined above further comprises a purified suspension comprising zero-valent-transition metal nanowires; preferably silver nanowires.

In a particular embodiment the purification process of step (iv) of the method for the preparation of zero-valent-transition metal nanowires as defined above further comprises a purified suspension comprising zero-valent-transition metal nanowires and zero-valent-transition metal nanoparticles; wherein the weight percentage of zero-valent-transition metal nanoparticles is below 20%, preferably below 10% and more preferably below 5% and even more preferably below 1%.

Without being bound to any theory in particular, the authors of the present invention believe that the purification process of the present invention allows obtaining a zero-valent-transition metal nanowire suspension with a lower weight percentage of nanoparticles. In particular the authors of the present invention have surprisingly found that the purification step of the method for the preparation of zero-valent-transition metal nanowires of the present invention leads to highly purified zero-valent-transition metal nanowires without causing aggregation and/or damage of the zero-valent-transition metal nanowires structure. Additionally, the purification process of the present invention is environmentally friendly and able for large scale purification processes. Moreover the purification process of the present invention allows the use of long-duration and resistant filters.

In a particular embodiment, the method for the preparation of zero-valent-transition metal nanowires as defined above further comprises diluting the suspension comprising zero-valent-transition metal nanowires resulting from step (iii) to form a diluted suspension comprising zero-valent-transition metal nanowires, preferably diluting the suspension resulting from step (iii) 20 times to form a diluted suspension comprising zero-valent-transition metal nanowires, and more preferably diluting the suspension resulting from step (iii) 40 times to form a diluted suspension comprising zero-valent-transition metal nanowires.

In a particular embodiment, the method for the preparation of zero-valent-transition metal nanowires as defined above further comprises drying the purified suspension of zero-valent-transition metal nanowires of steps (iv) to obtain dry purified zero-valent-transition metal nanowires.

In addition, the dry purified zero-valent-transition metal nanowires obtained by the method as defined above can be easily re-dispersed, for example by mild mechanical stirring, in water or/and in organic solvents. The resulting re-dispersions of purified zero-valent-transition metal nanowires present high stability, thus, not being necessary the addition of surfactants or stabilizers which produce undesired residues. Non-limitative examples of re-dispersing solvents include, without limitation water and alcohols such as methanol, ethanol, isopropanol and the like.

The resulting re-dispersions in suitable solvents are stable for characterizations and storage, but also for the preparation of conductive ink compositions.

In a particular embodiment, the tangential-flow filtration of step (c) of the purification process of step (iv) of the method for the preparation of zero-valent-transition metal nanowires as defined above further comprises recirculating the feed-flow comprising zero-valent-transition metal nanowires.

In the context of the present invention the term "recirculating" refers to circulate continuously the feed-flow comprising zero-valent-transition metal nanowires during the tangential flow filtration.

In a particular embodiment, the tangential-flow filtration of step (c) of the purification process of step (iv) of the method for the preparation of zero-valent-transition metal nanowires as defined above further comprises recirculating the feed-flow comprising zero-valent-transition metal nanowires at a flow rate range between 10 and 2500 ml/min per filter, preferably between 25 and 1500 ml/min per filter, more preferably between 50 and 750 ml/min per filter.

In a particular embodiment, the tangential-flow filtration of step (c) of the purification process of step (iv) of the method for the preparation of zero-valent-transition metal nanowires as defined above further comprises recirculating the feed-flow comprising zero-valent-transition metal nanowires during between 1 and 200 hours, preferably during between 5 and 150 hours, even more preferably during between 6 and 100 hours.

In a particular embodiment, the purification process of step (iv) of the method for the preparation of zero-valent-transition metal nanowires as defined above further comprises a filtration unit (F) comprising:
  a. a filter housing comprising an inlet, and a first outlet and a second outlet;
  b. at least one cylindrical filter allocated within the housing between the inlet and the first outlet and the second outlet; and
  wherein the inlet and the two outlets and are fluidically communicated.

In a more particular embodiment, the purification process of step (iv) of the method for the preparation of zero-valent-transition metal nanowires as defined above further comprises a filtration unit (F) comprising:
  a. a filter housing comprising an inlet (10), and a first outlet (20) and a second outlet (30);
  b. at least one cylindrical filter allocated within the housing between the inlet (10) and the first outlet (20) and the second outlet (30); and
  wherein the inlet (10) and the two outlets (20) and (30) are fluidically communicated; preferably as shown in FIG. 2.

In a particular embodiment, the at least one cylindrical filter is at least 2 filters in parallel allocated within the housing in the filtration unit; preferably at least 5 filters; more preferably at least 10 filters.

In a particular embodiment, the at least one cylindrical filter of the method for the preparation of zero-valent-transition metal nanowires as defined above, comprises at least one material selected from ceramics, metals and alloys such as stainless-steel; preferably alloys such as stainless-steel; more preferably stainless-steel.

In a particular embodiment, the at least one cylindrical filter of the method for the preparation of zero-valent-transition metal nanowires as defined above is a stainless-steel filter.

In a particular embodiment, the at least one cylindrical filter of the method for the preparation of zero-valent-transition metal nanowires as defined above comprises a wire mesh; preferably a stainless-steel wire mesh.

In a particular embodiment, the at least one cylindrical filter of the method for the preparation of zero-valent-transition metal nanowires as defined above, has a pore diameter between 0.01 and 10 microns, preferably between 0.1 and 5 microns, more preferably between 0.5 and 3 microns.

The filtration device for the preparation of zero-valent-transition metal nanowires as defined above is easy to clean, withstand several uses and avoids the aggregation of the zero-valent-transition metal nanowires.

Zero-Valent-Transition Metal Nanowires.

According to a disclosure, the invention describes zero-valent-transition metal nanowires obtainable by the method for the preparation of zero-valent-transition metal nanowires as defined above in any of its embodiments.

In a particular embodiment the zero-valent-transition metal nanowires as defined above are crystalline silver nanowires.

In a particular embodiment the zero-valent-transition metal nanowires as defined above have a diameter below 70 nm and an aspect ratio above 500, preferably the zero-valent-transition metal nanowires as defined above have a diameter below 50 nm and an aspect ratio above 700; more preferably the zero-valent-transition metal nanowires as defined above have a diameter below 30 nm and an aspect ratio above 1000.

Conductive Ink Composition.

According to a disclosure, the invention describes a conductive ink composition comprising zero-valent-transition metal nanowires obtained by the method for the preparation of zero-valent-transition metal nanowires as defined above in any of its embodiments.

In addition, the good wetting or drying of the purified suspension comprising zero-valent-transition metal nanowires as defined above allows coating them on different substrates.

In a particular embodiment the conductive ink composition comprising zero-valent-transition metal nanowires is able to coat a surface.

In a particular embodiment the conductive ink composition as defined above further comprises a solvent.

Uses.

According to a disclosure, the invention describes the use of the zero-valent-transition metal nanowires as defined above in optoelectronics, biochemical sensing, biomedical imaging, surface enhanced Raman scattering field, catalysis, electromagnetic interference shielding and anti-microbial applications.

Reactor Oven.

According to an additional aspect, the invention is directed to a reactor oven for the preparation of zero-valent-transition metal nanowires comprising:
  a thermally insulated chamber, comprising at least an entry and temperature control means;
  a conveyor adapted to perform a translational movement following a path;
  at least one rotating platform located on the conveyor; and
  at least one reactor located on the rotating platform; wherein said at least one reactor comprises a longitudinal axis X-X'; and wherein said rotating platform is adapted to perform a rotational movement around the longitudinal axis X-X' or around an axis W-W' parallel to said longitudinal axis X-X'.

A particular embodiment of the present invention is directed to a reactor oven (1) for the preparation of zero-valent-transition metal nanowires comprising:
- a thermally insulated chamber (1.1), comprising at least an entry (1.2) and temperature control means;
- a conveyor (2) adapted to perform a translational movement following a path;
- at least one rotating platform (3) located on the conveyor (2); and
- at least one reactor (4) located on the rotating platform (3); wherein said at least one reactor (4) comprises a longitudinal axis X-X'; and wherein said rotating platform (3) is adapted to perform a rotational movement around the longitudinal axis X-X' or around an axis W-W' parallel to said longitudinal axis X-X'; preferably as shown in FIG. 1.

In a particular embodiment, the reactor oven of the present invention is for the preparation of the zero-valent-transition metal nanowires of the present invention as described above.

Filtration Unit.

According to a disclosure, the invention describes a filtration unit (F) comprising:
a. a filter housing comprising an inlet, and a first outlet and a second outlet;
b. at least one cylindrical filter allocated within the housing between the inlet and the first outlet and the second outlet; and
wherein the inlet and the two outlets and are fluidically communicated.

A particular embodiment of the present invention is directed to a filtration unit (F) comprising:
c. a filter housing comprising an inlet (10), and a first outlet (20) and a second outlet (30);
d. at least one cylindrical filter allocated within the housing between the inlet (10) and the first outlet (20) and the second outlet (30); and
wherein the inlet (10) and the two outlets (20) and (30) are fluidically communicated; preferably as shown in FIG. 2.

In a particular embodiment the at least one cylindrical filter further comprises a stainless-steel wire mesh; and wherein said wire mesh has a pore diameter range of between 0.01 and 10 microns.

In a particular embodiment, the filtration unit of the present invention is for the preparation of the zero-valent-transition metal nanowires of the present invention as described above.

The reactor oven for the preparation of zero-valent-transition metal nanowires present all the advantages and characteristics as defined above for the method for the preparation of zero-valent-transition metal nanowires of the present invention in any of its embodiments.

EXAMPLES

The invention is illustrated by means of the following examples which in no case limit the scope of the invention.

Example 1: Preparation of Silver Nanowires Using Three Different Ovens

The following solutions were independently prepared:
1.27 mg/ml solution of KBr in ethylene glycol (EG) (KBr mother Solution);
2.06 mg/ml solution of tetra propyl ammonium chloride (TPA-C) in EG (TPA-C mother Solution);
8.83 mg/ml solution of polyvinylpyrrolidone (PVP) in EG (PVP Solution); and
10.71 mg/ml solution of $AgNO_3$ in EG ($AgNO_3$ Solution).

Procedure: The PVP solution described above was heated to 110° C. under vigorous stirring using a 500 ml round bottom flask in an oil bath with a temperature probe. Once the temperature was stabilized at 110° C., the solution was kept at that temperature for 2 hours and later it was let to cool down to room temperature. A mixture of TPA-C and KBr mother solutions having a 1.65 mole ratio of TPA-C/KBr, and the AgNO3 solution were subsequently added (in that order) to the PVP solution under stirring at room temperature, to form a reaction mixture. The reaction mixture was stirred for 5 min more at room temperature and equally divided among 15 solvothermal reactors (PTFE lined stainless steel reactors) having 50 ml capacity each.

Then, three different ovens were used to heat the reactors containing the same reaction mixture. Said ovens were as follows:
a. a convention oven: wherein thermal energy was transferred by convection and radiation to the chamber load; the convection oven used was a Nahita™ series 631 PLUS;
b. an air circulation oven: wherein thermal energy was transferred by convection and radiation to the chamber load; and a fan accelerated the heat transfer (convection) and air exchange, and distributed the temperature homogeneously within the chamber; the air circulation oven used was a POL-EKO™ model SLW 400; and
c. a reactor oven (FIG. 1) comprising a conveyor that followed an 9 m elliptical curved path and 15 circular rotating platforms with a 37 cm diameter each, that were located on the conveyor. The platforms were able to carry from 1 to 5 reactors depending on the dimensions of the reactors and the platform. Said reactors were cylindrical solvothermal reactors and comprised a longitudinal axis of rotation defined as X-X' which passed through the center of the cylinder. The reactors could be placed and fixed at the center of said rotating platform or at a certain distance to the center of the platform (FIGS. 1b and 1c). Therefore, each of the platforms was able to rotate around said rotation axis X-X' or around a rotation axis W-W' parallel to said ration axis X-X' (FIG. 1c). When several reactors were placed at a certain distance to the center said distance was the same for all of them. This oven also comprises a thermally insulated chamber with temperature control means. Thermal energy is transferred by convection and radiation to the thermally insulated chamber and a fan accelerates the heat transfer (convection) and air exchange and distributes the temperature homogeneously within the chamber.

The 15 reactors containing the same amount of the reaction mixture were heated as follows:
5 reactors were placed in different positions inside the convection oven pre-heated to 145° C., and the temperature was maintained during 7 hours;
5 reactors were placed in different positions inside the air circulation oven and were heated from room temperature to 180° C. in 30 min, kept at 180° C. for 60 min, heated from 160° C. to 180° C. in 30 min and kept at 160° C. for 5 hours; and
5 reactors were placed in the reactor oven; each reactor was placed on the center of a different platform of the reactor oven; then the reactors were heated from room temperature to 180° C. in 30 min, kept at 180° C. for 60 min, heated from 160° C. to 180° C. in 30 min and kept at 160° C. for 5 hours; and during the heating steps the conveyor was moving following an elliptical path at a constant frequency of 1 rpm and therefore the reactors performed a translational movement following an elliptical path at a constant frequency of 1 rpm.

After cooling down to room temperature, the suspensions obtained (comprising nanowires, nanoparticles, non-reacted salts, ions and non-reacted polymer) were purified using the filtration unit of FIG. 2 as follows. A 1 ml volume of the suspension was diluted and filtered by angular filtration as described in Example 5, obtaining a retentate. Then, the retentate was dispersed in a solvent to form a feed-flow comprising nanowires. Then, a tangential filtration step as described in Example 5 was performed wherein said feed-flow was recirculated through the filtration unit (F) of FIG. 2 at a flow rate of 65 ml/min during 4 h. During the recirculation, the feed flow comprising nanowires and nanoparticles was traveling tangentially across the surface of the stainless steel filter of the filtration unit. The nanoparticles present in said feed flow were selectively separated and removed through said filter from the product comprising nanowires. Finally, the excess of solvent was removed from the dispersion comprising nanowires and the product obtained comprising silver nanowires was dispersed and kept in deionized water, alcohol or a mixture thereof, for storage or further characterization.

Table 1 shows the characterization of the silver nanowires obtained in the products.

| | Nanowires | | |
|---|---|---|---|
| Oven | Diameter range (nm) | Length range (μm) | Yield (%) |
| Convention oven | 17-45 | 10-45 | 0-52 |
| Air circulation oven | 18-32 | 15-40 | 20-51 |
| Reactor oven Translational movement 1 rpm, Rotational movement 0 rpm | 17-22 | 15-25 | 46-52 |

The nanowires obtained using the reactor oven had uniform diameters, lengths and yields in all the samples obtained from the five reactors. However, the products obtained from a convention oven and from an air oven were different among the 5 reactors placed in different positions in said ovens. Therefore, the diameter and length ranges for these products were broader than for the products obtained in the reactor oven (see Table 1).

Example 2: Synthesis of Uniform Silver Nanowires with Different Diameters

Uniform silver nanowires with different average diameters were synthesized by four different reactions named reaction 1 to 4 as follows:

Reaction 1 (Silver Nanowires with 17±3 nm Average Diameter):
The following solutions were independently prepared:
1.20 mg/ml solution of KBr in EG (KBr mother Solution);
5.00 mg/ml solution of TPA-C in EG (TPA-C mother Solution);
8.83 mg/ml solution of PVP powder in EG (PVP solution); and
10.71 mg/ml solution of $AgNO_3$ in EG ($AgNO_3$ Solution).

Procedure: The PVP Solution was heated at 110° C. under vigorous stirring in a 50 mL round bottom flask equipped with a silicone oil bath and a temperature probe and was kept at that temperature for 2 hours. Later, the oil bath was removed and the reaction was allowed to cool down to room temperature. Then, the PVP solution is transferred to a 50 ml solvothermal reactor.

A mixture of TPA-C and KBr mother solutions with a 1.61 mole ratio of TPA-C/KBr was quickly added to the PVP solution under stirring. After that, the $AgNO_3$ solution was added to the mixture and stirred for 5 min to form a reaction mixture.

The reactor oven was used to heat the solvothermal reactor. The reactor with the reaction mixture was placed in the center of a platform of the reactor oven and were heated to 135° C. and kept at that temperature for 7 h; during the heating the reactors performed a translational movement following an elliptical path at 1 rpm.

After let the reaction mixture cool down to room temperature, the obtained product was purified as described in Example 1 and the solids obtained comprising silver nanowires were dispersed and kept in deionized water, alcohol or a mixture thereof, for storage or further characterization.

Reaction 2 (Silver Nanowires with 30±7 nm Average Diameter):
This example followed the same procedure explained in reaction 1. The only differences in the process were as follows:
The following solutions were independently prepared:
1.96 mg/ml solution of KBr in EG (the KBr mother Solution); and
4.20 mg/ml solution of TPA-C in EG (the TPA-C mother Solution).

A 2.33 mole ratio mixture of TPA-C/KBr obtained from the solutions described above, was added quickly to the PVP solution. Also, the reactors containing the reaction mixture were heated to 160° C. and kept at that temperature for 7 h.

Reaction 3 (Silver Nanowires with 70±12 nm Average Diameter):
This example followed the same procedure explained in reaction 1. The only differences in the process were as follows:
Only NaCl is used. A solution of 1.51 mg/ml of NaCl in EG (the NaCl mother Solution) was prepared and 97 μl of said solution was added to the reactor with the reaction mixture. The reactors with the reaction mixture were heated to 160° C. and kept at that temperature for 7 h.

Reaction 4 (Silver Nanowires with 100±20 nm Average Diameter):
This example followed the same procedure explained in reaction 1. The only differences in the process were as follows:
Only BMIM-CL is used. A solution of 4.73 mg/ml of BMIM-Cl in EG (the BMIM-Cl mother Solution) and 108 μl of said solution was added to the reactor with the reaction mixture. The reactors with the reaction mixture were heated to 160° C. and kept at that temperature for 7 h.

Table 2 shows the characteristics of the silver nanowires obtained by reactions 1 to 4 in a reactor oven. The results showed that by simple modifications of the method of obtaining silver nanowires in a reactor oven such as salts used and temperature and heating time, the characteristics of the nanowires such as average diameter or length range can be modified. In particular, the products obtained from reactions 1-4 show that by changing the salts used nanowires such with different average diameter or length range can be obtained.

| Number | Salts | Temp-time | Average diameter (nm) | Length range (μm) |
|---|---|---|---|---|
| Reaction 1 | TPA-C, KBr | 135° C.-7 h | 17 ± 3 | 15-25 |
| Reaction 2 | TPA-C, KBr | 160° C.-7 h | 30 ± 7 | 30-50 |
| Reaction 3 | NaCl | 160° C.-7 h | 70 ± 12 | 40-70 |
| Reaction 4 | BMIM-Cl | 160° C.-7 h | 100 ± 20 | 50-90 |

Example 3: Escalating the Synthesis of Silver Nanowires in Different Reactors

The synthesis of uniform silver nanowires has been scaled-up using different types of reactors: a 50 ml PTFE-lined stainless steel solvotermal reactor, a 1 l PTFE-lined stainless steel solvotermal reactor and a 1 l PTFE-coated aluminium reactor.
The following solutions were independently prepared:
3.72 mg/ml solution of NaCl in EG (NaCl mother Solution);
8.83 mg/ml solution of PVP in EG (PVP Solution); and
10.71 mg/ml solution of AgNO₃ in EG (AgNO₃ Solution).
Reaction 5:
The PVP solution described above was heated to 110° C. under vigorous stirring using a 2 L round bottom flask, and once the temperature reached 110° C., it was kept at that temperature for 2 hours. Then, the reaction was allowed to cool down to room temperature. Later, 13.76 ml of NaCl mother solution was quickly added under stirring to the PVP solution and, after that, the AgNO₃ solution was also quickly added under vigorous stirring at room temperature, to form a reaction mixture. Then, 35 ml of the reaction mixture were poured to a 50 ml PTFE-lined stainless steel solvothermal reactor. And, additionally, two batches of 700 ml of the same reaction mixture were added to a 1 l PTFE-lined stainless steel solvothermal reactor and to a 1 l PTFE-coated aluminum reactor, respectively. Said reactors were heated to 160° C. and kept at that temperature for 7 hours in the reactor oven, during the heating the conveyor was moving following an elliptical path at a constant frequency of 1 rpm and therefore the reactors performed a translational movement following an elliptical path at a constant frequency of 1 rpm.
After cooling down to room temperature, the reaction mixture was purified as described in Example 1 and the obtained solids comprising silver nanowires were dispersed and kept in deionized water, alcohol or a mixture thereof, for storage or further characterization.
Table 3 shows the yields and the characteristics of the obtained products when using different reactors.
When using a 1 l PTFE-lined stainless steel reactor, no nanowires are produced. However, by using the 1 l designed PTFE-coated aluminum reactor in the same conditions (temperature and time), new nanowires with different diameter, length and yield can be obtained. Also, using the PTFE-coated aluminium reactor, 20 times more amount of silver nanowires of similar length and diameter ranges at similar yield have been obtained by adjusting the temperature program used in the reactor oven as follows: heating from room temperature to 180° C. in 30 min, keeping at 180° C. for 60 min, heating from 180° C. to 160° C. in 30 min, at keeping at 160° C. for 5 hours.
Table 3 shows the silver nanowires characterization (yield, average diameter and length ranges) that were obtained in different (size and materials) reactors. The results showed that the method is able to be scaled-up.

| Reactor | Filled Vol. (ml) | Temp.(° C.)-time (h) | Yield (%) | Average diameter(±X) (nm) | Length range (μm) |
|---|---|---|---|---|---|
| PTFE-lined stainless steel reactor (50 ml) | 35 | 160° C.-7 h | 91 | 70 ± 12. | 20-50 |
| PTFE-lined stainless steel reactor (1 l) | 700 | 160° C.-7 h | 0 | Only Nanoparticles | — |
| PTFE-coated aluminum reactor (1 l) | 700 | 160° C.-7 h | 70 | 40 ± 8 | 20-35 |
| PTFE-coated aluminum reactor (1 l) | 700 | Variable temperature programs-7 h | 89 | 70 ± 12. | 20-50 |

Example 4: Effect in Silver Nanowires of Translational and Rotational Movements Performed at Different Frequencies The following solutions were prepared separately:
mg/ml of NaCl in EG (NaCl mother Solution);
8.83 mg/ml solution of PVP in EG (PVP Solution); and
10.71 mg/ml solution of AgNO₃ in EG (AgNO₃ Solution).
Reaction 6:
The PVP solution described above was heated at 110° C. under vigorous stirring in a 100 ml round bottom flask (equipped with a silicone oil bath and a temperature probe) and kept at that temperature for 2 hours. Then the oil bath was removed and the reaction was allowed to cool down to room temperature. Then, 0.294 ml of NaCl mother solution was quickly added under stirring. After that, the AgNO₃ solution, prepared by dissolving AgNO₃ salt in EG in a 50 ml round bottom flask during 30 min high speed stirring, was quickly added to the mixture and kept under vigorous stirring for 5 minutes at room temperature.
Then, two 50 ml solvothermal reactors were filled up with the reaction mixture. Said reactors containing the reaction mixture, were placed in the reactor oven described above, heated to 160° C. and kept at that temperature for 7 hours.
During the 7 hours of heating at 160° C. the first reactor was kept in the same place. The second reactor was placed on the platform at 20 cm to the center of the platform. Therefore, during the heating, said second reactor performed the following simultaneous movements: a translational movement following an elliptical path at a constant frequency of 1 rpm and a rotational movement around a rotation axis W-W' parallel to the reactor's longitudinal axis X-X' at a constant frequency 10 rpm. Said rotation axis W-W' passed through the center of the platform and therefore, the platform was rotating around said rotation axis W-W' during the heating.
After cooling down to room temperature, the reaction mixture was purified as described in Example 1 and, the obtained products comprising silver nanowires were dispersed and kept in deionized water, alcohol or a mixture thereof, for storage or further characterization.
Reaction 7:
This example followed the same procedure explained in reaction 6 but with a rotational movement around the rotation axis W-W' parallel to the reactor's longitudinal axis X-X' at a constant frequency of 50 rpm.
Reaction 8:
This example followed the same procedure explained in reaction 6 but with a rotational movement around the rotation axis W-W' parallel to the reactor's longitudinal axis X-X' at a constant frequency of 100 rpm.

Reaction 9:

This example followed the same procedure explained in reaction 6. However in this example, the second reactor was placed on the center of the platform. Therefore, during the heating, said second reactor performed the following simultaneous movements: a translational movement following an elliptical path at a constant frequency of 1 rpm and a rotational movement around the reactor's longitudinal axis X-X' at a constant frequency 10 rpm. Therefore, said rotation axis X-X' passed through the center of the platform the platform was rotating around said rotation axis X-X' during the heating at a constant frequency of 10 rpm.

Reaction 10:

This example followed the same procedure explained in reaction 9 but with a rotational movement around the reactor's longitudinal axis (X-X') at a constant frequency of 50 rpm.

Reaction 11:

This example followed the same procedure explained in reaction 9 but with a rotational movement around the reactor's longitudinal axis (X-X') at a constant frequency of 100 rpm.

Table 4 shows the effect of changes in the rotational movement rpm on silver nanowires characteristics (diameter, length and yield).

The results showed that changes in the rotation movement frequency when it is performed around a the reactor's longitudinal axis X-X' at a constant frequency (i.e. the reactor is placed on the center of the platform and the rotation axis X-X' passes through the center of said platform) can significantly reduce the length ranges of the silver nanowires. Thus, making more uniform nanowires.

Additionally, changes in the rotation movement frequency of the rotational movement when it is performed around a rotation axis W-W' parallel to the reactor's longitudinal axis X-X' at a constant frequency (i.e. the reactor is placed on the platform at a certain distance of the center of said platform and the rotation axis W-W' passes through the center of said platform) can significantly affect the length, diameter and yield of the products comprising silver nanowires. In particular when the rotation movement frequency of the rotational movement performed around a rotation axis W-W' parallel to the reactor's longitudinal axis X-X' at a constant frequency is around 50 rpm the maximum nanowire yield values and lengths were obtained.

| Reaction | Translational (rpm) movement | Rotational movement (rpm) Axis X-X' | Rotational movement (rpm) Axis W-W' | Average diameter (nm) | Length range (µm) | Yield (%) | Aspect Ratio |
|---|---|---|---|---|---|---|---|
| Reaction 6, 7, 8, 9, 10, 11 | 0 | 0 | 0 | 60 ± 10 nm | 20-50 | 75% | 583 |
| Reaction 6 | 1 | — | 10 | 60 ± 10 nm | 55-70 | 90% | 1042 |
| Reaction 7 | 1 | — | 50 | 150 ± 25 nm | 70-120 | 95% | 633 |
| Reaction 8 | 1 | — | 100 | 120 ± 22 nm | 50-100 | 92% | 625 |
| Reaction 9 | 1 | 10 | — | 60 ± 10 nm | 20-50 | 72% | 583 |
| Reaction 10 | 1 | 50 | — | 60 ± 10 nm | 20-40 | 75% | 500 |
| Reaction 11 | 1 | 100 | — | 60 ± 10 nm | 20-30 | 78% | 416 |

Example 5: Purification

The products from reactions 1-3 were purified and their characteristics were studied, in particular the amount of nanoparticles in the products.

FIG. 2 shows a scheme of the filtration unit. The filtration unit used in the examples comprised a filter housing (220 mm length and 20 mm external diameter) with an inlet, a first outlet and a second outlet. Inside the filtration unit there was a stainless steel wire mesh cylindrical filter with a pore diameter of 2 microns. Said filter was allocated within the housing between the inlet and the first outlet, and the second outlet. Additionally, the filtration unit allowed fluid communication between the inlet and the two outlets.

The purification process was as follows. 1 ml of the reaction mixture obtained from reaction 1 (a mixture comprising nanowires, nanoparticles, non-reacted salts, ions and non-reacted polymer) was purified.

Said 1 ml was diluted twice with deionized water to form a suspension. Then, an angular filtration of the suspension was performed using the filtration unit described above to obtain a retentate comprising nanowires. During the angular filtration step the outlet of the filtration unit was closed. Therefore, the fluid circulate from the inlet to the outlet passing through the stainless-steel filter. Most of the nanowires, a few big particles, part of the un-reacted ethylene glycol and salts in excess among others, were retained forming a filter cake (or retentate). The, to remove the excess of ethylene glycol and salts, a few milliliters of deionized water were used to wash said filter cake (or retentate).

The retentate then dispersed in a deionized water to form a feed-flow comprising nanowires and a tangential filtration step is performed.

During said tangential filtration step the inlet and the two outlets and of the filtration unit were open. The feed-flow was diluted using 100 ml of deionized water (i.e. using a diluting factor of 100) and was recirculated through the filter case at a flow rate of 65 ml/min during 180 min. Consequently, the feed-flow comprising nanowires and nanoparticles traveled tangentially across the surface of the filter while being recirculated. Most of the nanoparticles present in said feed flow were selectively separated from the nanowires by passing through the filter and left the filtration unit through the outlet as the filtration flow.

After that, the outlet was closed again and all of the deionized water in excess was extracted through the filter and the outlet. Then, the purified filter cake or retentate inside the filter comprising nanowires was dried by passing $N_2$ gas through it and then dispersed in different solvents for further characterization and storage.

The same purification procedure explained above was used for the suspensions obtained from reactions 2 and 3 but using different flow rates and diluting factors: 130 ml/min and 40 and 260 ml/min and 20 respectively.

Table 5 shows the weight percentage of silver nanoparticles (AgNPs) present in the solids obtained by modifying different parameters in the purification process described. It is worth noting that these results can be improved by increasing the time or/and increasing the dilution factor of the purification process.

| Reaction number | Average diameter (nm) | Diluting Factor | Recirculation time (min) | Flow rate (ml/min) | AgNPs (before purification) (wt %) | AgNPs (after purification) (wt %) |
|---|---|---|---|---|---|---|
| Reaction 1 | 17 ± 3 | 100 | 180 | 65 | 60 | 5 |
| Reaction 2 | 30 ± 7 | 40 | 120 | 130 | 40 | 2 |
| Reaction 3 | 70 ± 12 | 20 | 60 | 260 | 20 | 0 |

Example 6: Characterization of Nanowires by SEM and TEM Spectroscopy

The quality and dimensions (average diameter, length ranges and yield) of the silver nanowires in some of the above examples were evaluated by Scanning Electron Microscopy (SEM) (FIG. 3), by Transmission Electron Microscopy (TEM) and also by electron diffraction measurements (FIG. 4).

SEM micrographs were taken by using Hitachi Tabletop microscope model TM3030 with a magnification range between 15 to 30000×. The microscope has a pre-centered cartridge filament as electron gun and a high-Sensitivity semiconductor 4-segment BSE detector as single detection system. This System operates at room temperature and in ambient air conditions. The micrographs were processed using TM3030 software. The samples for SEM observation were prepared by drop casting them on a glass substrate. FIG. 3 shows SEM micrographs of FIG. 3d example 2 reaction 1, FIG. 3c example 2 reaction 2, FIG. 3b example 2 reaction 3 and FIG. 3a example 2 reaction 4. Uniform silver nanowires having a similar diameter among them can be observed in each of the micrographs showed in FIG. 3.

Each average diameter value was calculated from an average of the values obtained by measuring the diameters of more than 100 nanowires using high resolution SEM micrographs. Also, diameter and length ranges were calculated from the lengths of more than 100 nanowires measured using high resolution SEM micrographs. Additionally, the AgNPs mass percentage in the samples was calculated from measuring the area of AgNPs and the area of silver nanowires in SEM micrographs.

Dispersions of silver nanowires are obtained in water on in an appropriate mixture of water and/or organic solvents such as ethanol, 1-propanol, 2-propanol and methanol by 10 min stirring. Optical absorption spectroscopy (OAS) was measured on silver nanowires dispersions using a Perkin Elmer LAMBDA 750 UV/Vis/NIR diode array recorded over a 300-800 nm range with air as reference and 1 nm resolution. OAS measurements were used to estimate the concentration of silver nanowires using the Beer-Lambert law, according to the relation A=εbc, where A is the absorbance, b [cm] is the light path length, c [gL$^{-1}$] is the concentration of the silver nanowire dispersion and ε [L·g$^{-1}$·cm$^{-1}$] is the absorption coefficient. The absorption coefficient ε (L·g$^{-1}$·cm$^{-1}$) was determined experimentally at max peak for each averaged diameter nanowires. The yield (%) of each reaction was calculated by comparing the amount of silver obtained in the nanowire's final samples with the amount of silver at the beginning of the reaction.

TEM micrographs were obtained in a JEOL model Transmission Electron Microscope JEM 2100 with an accelerating voltage of 200 KV. The microscope has TEM and STEM operation modes with bright field detector, a multi-scan CCD camera and mode composition analysis by XEDS. EELS analyses were carried out on electron energy loss spectroscopy (EELS), 2.5 Å point resolution and ±30° tilt goniometer. All the TEM Samples were prepared by drop casting of dispersions on carbon coated copper grids.

FIG. 4 shows one nanowire characterization obtained in example (reaction 2). FIG. 4a shows a TEM micrograph of a silver nanowire with a uniform diameter through its length. In a higher magnification shown in FIG. 4b, a PVP layer with about 1.5 nm thickness covering the nanowire surface and two panels of a polygonal nanowire structure can be observed. The electron diffraction patterns of an area of silver nanowires attributed to the planes (111) and (110) are shown in FIG. 4c. In a single crystal this angle is 35°. The angle between these two zones was less than 30° which indicates that the silver nanowires are singly twinned crystals. The FIG. 3d shows the silver nanowire EDX spectrum, which shows that the nanowires are formed by pure silver with no salts remaining in their composition.

The invention claimed is:

1. A method for the preparation of zero-valent-transition metal nanowires comprising the steps of:
   i) providing a reaction mixture comprising: at least one capping agent, at least one transition metal salt, and at least one polar solvent;
   ii) adding the reaction mixture obtained in step (i) to at least one reactor;
   iii) heating the at least one reactor of step (ii) at a temperature between 30 and 300° C. for a period of time between 10 min and 7 days under a pressure of at least 100 KPa in a reactor oven to obtain a suspension comprising zero-valent-transition metal nanowires; wherein said at least one reactor comprises a longitudinal axis X-X' and performs at least one of the following movements:
   a translational movement following a closed-path, and
   a rotational movement around the longitudinal axis X-X' or around an axis W-W' parallel to said longitudinal axis X-X', at a constant frequency between 1 and 100 rpm; and
   iv) optionally performing a purification process of the suspension obtained in step (iii) to obtain a purified suspension comprising zero-valent-transition metal nanowires.

2. The method for the preparation of zero-valent-transition metal nanowires according to claim 1, wherein the reaction mixture obtained in step (i) comprises a capping agent:transition metal salt molar ratio between 0.1 and 10.

3. The method for the preparation of zero-valent-transition metal nanowires according to claim 1, wherein said at least one reactor of step (iii) performs at least the rotational movement around the longitudinal axis X-X' or around the axis W-W' parallel to said longitudinal axis X-X', at the constant frequency between 1 and 100 rpm.

4. The method for the preparation of zero-valent-transition metal nanowires according to claim 1, wherein said at least one reactor of step (iii) simultaneously performs the rotational movement around the longitudinal axis X-X' or around the axis W-W' parallel to said longitudinal axis X-X', at the constant frequency between 1 and 100 rpm, and the translational movement following the closed-path.

5. The method for the preparation of zero-valent-transition metal nanowires according to claim 1, wherein either the translational movement following the closed-path or the rotational movement of step (iii) is performed at the constant frequency between 1 and 100 rpm.

6. The method for the preparation of zero-valent-transition metal nanowires according to claim 1, wherein the reactor oven comprises:
- a thermally insulated chamber, comprising at least an entry and temperature control means;
   - a conveyor adapted to perform the translational movement following a path; and
   - at least one rotating platform located on the conveyor;
- wherein said rotating platform is adapted to perform the rotational movement around the longitudinal axis X-X' or around the axis W-W' parallel to said longitudinal axis X-X'; and
- wherein the at least one reactor is located on the rotating platform.

7. The method for the preparation of zero-valent-transition metal nanowires according to claim 1, wherein the at least one reactor is at least two reactors; and wherein said at least two reactors simultaneously perform the translational movement following the closed-path, and the rotational movement around the axis W-W' parallel to said longitudinal axis X-X'.

8. The method for the preparation of zero-valent-transition metal nanowires according to claim 1, wherein the purification process of step (iv) comprises:
  a. performing an angular filtration of the suspension of step (iv) to obtain a retentate comprising zero-valent-transition metal nanowires;
  b. dispersing the retentate obtained in step (a) in a solvent to form a feed-flow comprising zero-valent-transition metal nanowires; and
  c. performing a tangential-flow filtration of the feed-flow obtained in step (b) to obtain a purified suspension comprising zero-valent-transition metal nanowires; and
  d. optionally, repeating steps from (a) to (c).

9. The method for the preparation of zero-valent-transition metal nanowires according to claim 8, wherein the tangential-flow filtration of step (c) further comprises recirculating the feed-flow comprising zero-valent-transition metal nanowires.

10. The method for the preparation of zero-valent-transition metal nanowires according to claim 1, wherein the purification process of step (iv) comprises a filtration unit (F) comprising:
  a. a filter housing comprising an inlet, and a first outlet and a second outlet;
  b. at least one cylindrical filter allocated within the housing between the inlet and the first outlet and the second outlet; and
  wherein the inlet and the two outlets and are fluidically communicated.

11. The method for the preparation of zero-valent-transition metal nanowires according to claim 1, wherein the zero-valent-transition metal nanowires are crystalline silver nanowires.

12. The method according to claim 1, wherein the at least one reactor is suitable for holding pressure at between 1 and 500 kPa.

13. The method of claim 12, wherein the at least one reactor is a solvothermal or hydrothermal reactor.

* * * * *